United States Patent
Urano

(10) Patent No.: US 11,745,768 B2
(45) Date of Patent: *Sep. 5, 2023

(54) VEHICLE DISPATCH SYSTEM, VEHICLE DISPATCH SERVER, AND VEHICLE DISPATCH METHOD

(71) Applicant: TOYOTA JIDOSHA KABUSHIKI KAISHA, Toyota (JP)

(72) Inventor: Hiromitsu Urano, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

This patent is subject to a terminal disclaimer.

(21) Appl. No.: 17/467,978

(22) Filed: Sep. 7, 2021

(65) Prior Publication Data

US 2022/0081010 A1   Mar. 17, 2022

(30) Foreign Application Priority Data

Sep. 11, 2020  (JP) ................................ 2020-153079

(51) Int. Cl.
*B60W 60/00* (2020.01)
*G05D 1/00* (2006.01)

(52) U.S. Cl.
CPC ..... *B60W 60/00253* (2020.02); *G05D 1/0027* (2013.01)

(58) Field of Classification Search
CPC .............. B60W 60/00253; G05D 1/0027
See application file for complete search history.

(56) References Cited

U.S. PATENT DOCUMENTS

| | | | |
|---|---|---|---|
| 9,944,283 B2 | 4/2018 | Kindo et al. |
| 10,401,868 B2 | 9/2019 | Urano et al. |
| 10,464,556 B2 | 11/2019 | Sakuma et al. |
| 10,539,962 B2 | 1/2020 | Sogen et al. |
| 10,656,651 B2 | 5/2020 | Ozawa et al. |
| 10,789,848 B2 | 9/2020 | Altintas et al. |
| 11,054,823 B2 | 7/2021 | Hashimoto et al. |
| 11,085,779 B2 | 8/2021 | Urano et al. |
| 11,144,073 B2 | 10/2021 | Kanehara et al. |
| 11,220,262 B2 | 1/2022 | Sone et al. |
| 11,262,755 B2 | 3/2022 | Toyoda |
| 11,281,215 B2 | 3/2022 | Yoshizaki et al. |

(Continued)

FOREIGN PATENT DOCUMENTS

| | | |
|---|---|---|
| JP | 2020-67761 A | 4/2020 |
| JP | 2021-140394 A | 9/2021 |
| WO | 2019/220205 A1 | 11/2019 |

*Primary Examiner* — Jelani A Smith
*Assistant Examiner* — Nada Mahyoob Alqaderi
(74) *Attorney, Agent, or Firm* — Sughrue Mion, PLLC

(57) ABSTRACT

A vehicle dispatch system includes an dispatched candidate vehicle selection unit configured to select a plurality of dispatched candidate vehicles for the point of dispatch from the plurality of autonomous driving vehicles based on the point of dispatch and the positions of autonomous driving vehicles, a route search unit configured to search routes to the point of dispatch for the dispatched candidate vehicles based on the point of dispatch, the positions of dispatched candidate vehicles and the map information, a vehicle dispatch control unit configured to dispatch at least two or more of the dispatched candidate vehicles to the point of dispatch, when the dispatched candidate vehicles is selected.

14 Claims, 13 Drawing Sheets

(56) References Cited

U.S. PATENT DOCUMENTS

| | | |
|---|---|---|
| 2017/0248963 A1 | 8/2017 | Levinson et al. |
| 2018/0209803 A1 | 7/2018 | Rakah et al. |
| 2018/0211541 A1* | 7/2018 | Rakah .................... G08G 1/148 |
| 2018/0321688 A1 | 11/2018 | Chase et al. |
| 2019/0094859 A1 | 3/2019 | Nix et al. |
| 2019/0186936 A1* | 6/2019 | Ebner .................... G06N 20/00 |
| 2020/0126428 A1* | 4/2020 | Tonosaki ............... G06Q 50/30 |
| 2020/0240805 A1 | 7/2020 | Kanajan et al. |
| 2021/0163040 A1 | 6/2021 | Kojo |

* cited by examiner

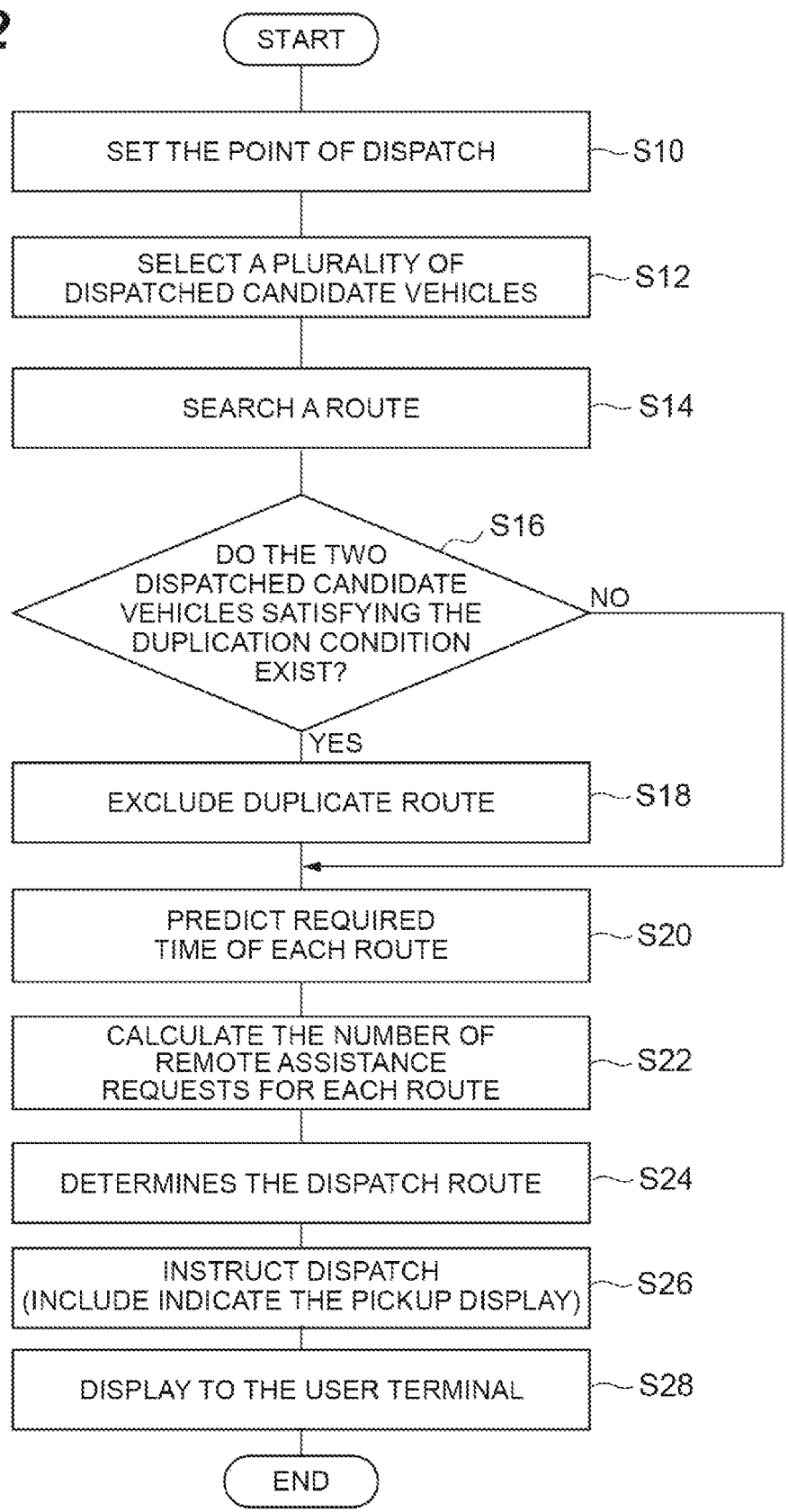

VEHICLE DISPATCH SYSTEM, VEHICLE DISPATCH SERVER, AND VEHICLE DISPATCH METHOD

TECHNICAL FIELD

The present disclosure relates to a vehicle dispatch system, a vehicle dispatch server, and vehicle dispatch method.

BACKGROUND

In the related art, International Publication No. 2019-220205 is known as technical literature relating to a vehicle dispatch system. International Publication No. 2019-220205 discloses that, in the vehicle dispatch system in which an autonomous driving vehicle is dispatched in response to a request from a user, a boarding/disembarking position candidate in the vicinity of the user's requested point is calculated, a car-dispatching vehicle is set for each boarding/disembarking position candidate, and the car-dispatching vehicle and the boarding/disembarking position are determined based on the total trip time for each boarding/disembarking position candidate.

CROSS-REFERENCE TO RELATED APPLICATION

This application claims the benefit of priority from Japanese Patent Application No. 2020-153079, filed Sep. 11, 2020, the entire contents of which are incorporated herein by reference.

SUMMARY

Even if an attempt is made to dispatch a vehicle to the point of dispatch requested by the user by autonomous driving, there is a possibility that the dispatch of the vehicle becomes impossible or the arrival time of autonomous driving vehicle is significantly delayed due to a change in the traffic situation. In addition, it is desirable that the autonomous driving vehicle running on the dispatch instruction waiting runs toward the position where the user potentially exists.

An aspect of the present disclosure is provided with a vehicle dispatch system for dispatching an autonomous driving vehicle to a predetermined point of dispatch. The vehicle dispatch system includes an dispatched candidate vehicle selection unit configured to select a plurality of dispatched candidate vehicles for the point of dispatch from the autonomous driving vehicles based on the point of dispatch and the positions of the autonomous driving vehicles, a route search unit configured to search routes to the point of dispatch for dispatched candidate vehicles based on the point of dispatch, the positions of dispatched candidate vehicles and the map information, and a vehicle dispatch control unit configured to dispatch at least two or more of the dispatched candidate vehicles to the point of dispatch, when the dispatched candidate vehicles is selected.

In the vehicle dispatch system according to an aspect of the present disclosure, by dispatching a plurality of vehicles to the point of dispatch where the user is present, it is possible to realize a vehicle dispatch with a high degree of certainty for the user, and it is possible to improve the chance of attracting customers of the potential user as compared with the case where only one vehicle is dispatched and the remaining vehicle is driven without any purpose.

In the vehicle dispatch system according to an aspect of the present disclosure, the route search unit may exclude at least one of the routes so as not to satisfy the duplication condition when the two dispatched candidate vehicles whose routes satisfy the duplication condition are present.

In the vehicle dispatch system according to an aspect of the present disclosure, the vehicle dispatch control unit may cause any one of at least two or more of the dispatched candidate vehicles running toward the point of dispatch to indicate a pickup display with respect to the outside of the vehicle, and the remaining dispatched candidate vehicles do not indicate the pickup display.

In the vehicle dispatch system according to an aspect of the present disclosure, the vehicle dispatch system may include a user display control unit for causing a user terminal to display vehicle dispatch related information. The user display control unit causes the user terminal to display that any one of at least two or more of the dispatched candidate vehicles traveling toward the point of dispatch cannot be dispatched, and causes the user terminal to display that the remaining dispatched candidate vehicles can be dispatched.

In the vehicle dispatch system according to an aspect of the present disclosure, the vehicle dispatch control unit determines whether or not a preset vehicle narrowing down condition is satisfied based on the distance between the point of dispatch and the dispatched candidate vehicles traveling toward the point of dispatch or the required time of the dispatched candidate vehicles arrival to the point of dispatch, and stops the dispatch of at least one vehicle of the dispatched candidate vehicle to the point of dispatch when the vehicle narrowing down condition is determined to be satisfied.

In the vehicle dispatch system according to an aspect of the present disclosure, the vehicle dispatch system may include a remote assistance request number calculation unit for calculating the remote assistance request number, which is the remote assistance request number that the dispatched candidate vehicle requests the remote operator for remote assistance, based on the route and a remote assistance request condition set in advance. The dispatched candidate vehicles are remote assistance vehicles for performing autonomous driving by receiving remote assistance from a remote operator, and the vehicle dispatch control unit narrows down the plurality of the dispatched candidate vehicles so that the total number of the remote assistance requests is equal to or less than a total request threshold.

Another aspect of the present disclosure is provided with a vehicle dispatch server for dispatching a plurality of autonomous driving vehicles to a predetermined point of dispatch. The vehicle dispatch server includes an dispatched candidate vehicle selection unit configured to select a plurality of dispatched candidate vehicles for the point of dispatch from the autonomous driving vehicles based on the point of dispatch and the positions of the plurality of autonomous driving vehicles, a route search unit configured to search routes to the point of dispatch for the dispatched candidate vehicles based on the point of dispatch, the positions of dispatched candidate vehicles and the map information, and a vehicle dispatch control unit configured to dispatch at least two or more of the dispatched candidate vehicles to the point of dispatch, when the plurality of the dispatched candidate vehicles is selected.

Another aspect of the present disclosure is provided with a vehicle dispatch method in a vehicle dispatch system for dispatching a plurality of autonomous driving vehicles to a predetermined point of dispatch. The method includes selecting a plurality of dispatched candidate vehicles for the point of dispatch from the autonomous driving vehicles based on the point of dispatch and the positions of autonomous driving vehicles, searching routes to the point of dispatch for the plurality of the dispatched candidate vehicles based on the point of dispatch, the positions of dispatched candidate vehicles and the map information, and dispatching at least two or more of the dispatched candidate vehicles to the point of dispatch, when the dispatched candidate vehicles is selected.

As described above, according to each embodiment of the present disclosure, it is possible to realize a highly reliable vehicle dispatch to a user and to improve an opportunity for attracting customers by a potential user.

BRIEF DESCRIPTION OF THE DRAWINGS

FIG. 12 is a flowchart illustrating an example of the vehicle dispatch start process.

DETAILED DESCRIPTION

Hereinafter, an example of the present disclosure will be described with reference to accompanying drawings.

The vehicle dispatch system according to this embodiment is a system for dispatching autonomous driving vehicles in response to a vehicle dispatch request from a user. The vehicle dispatch request includes a ride request for use of the autonomous driving vehicle as a taxi or a pickup request for use of the autonomous driving vehicle as delivery.

Configuration of Vehicle Dispatch System

Figure 1:
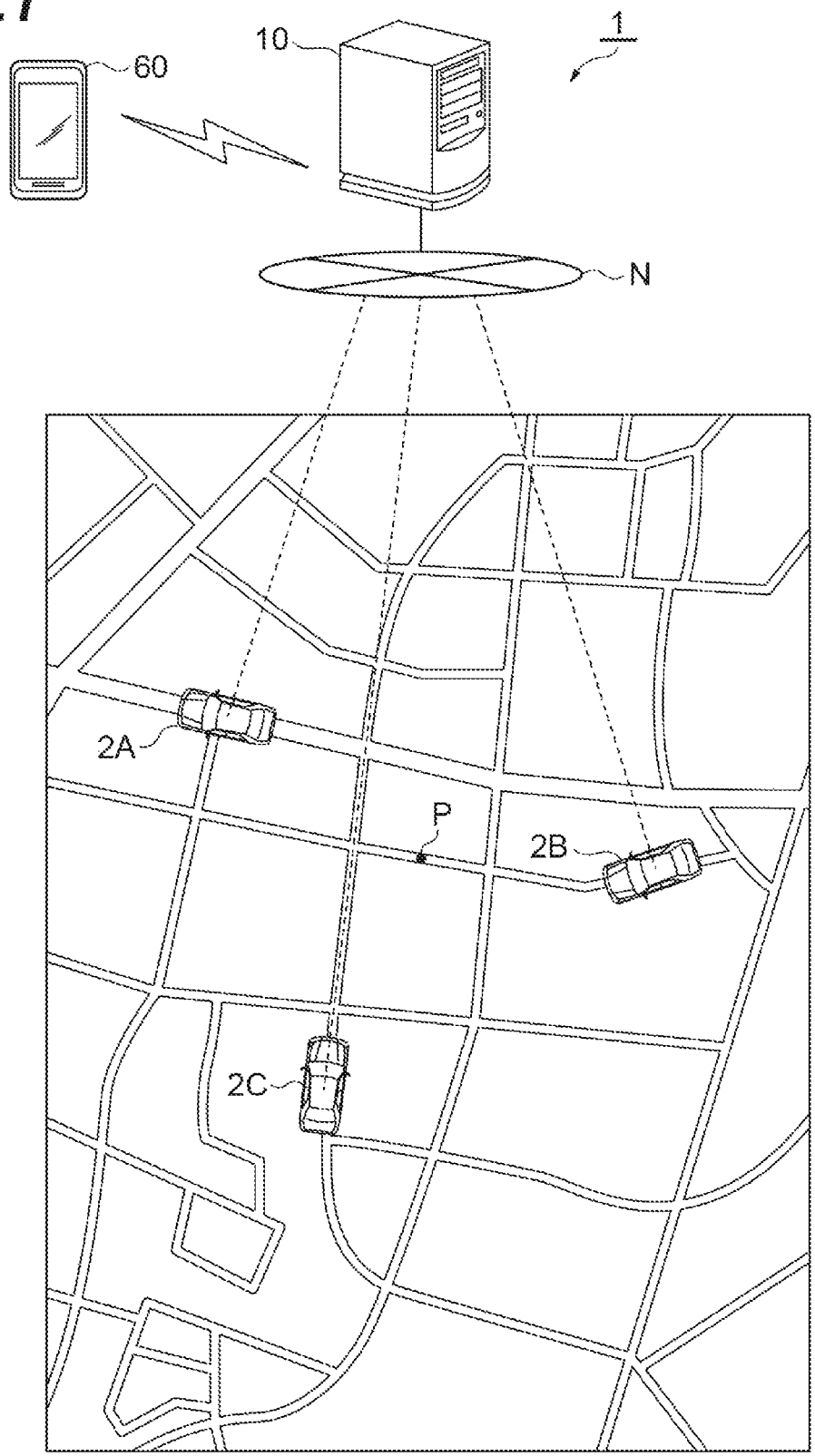
FIG. 1 is a block diagram illustrating a vehicle dispatch system according to an embodiment.

As illustrated in FIG. 1, the vehicle dispatch system 1 includes vehicle dispatch server 10. The vehicle dispatch server 10 will be described later. In addition to the vehicle dispatch server 10, the vehicle dispatch system 1 may include the autonomous driving vehicle 2 or a part of the autonomous driving vehicle 2.

The vehicle dispatch server 10 is capable of communicating with the user terminal 60, for example, and sets a point of dispatch P in response to a vehicle dispatch request from the user terminal 60. The vehicle dispatch server 10 may be a server installed in a facility. The vehicle dispatch server 10 may be mounted on a mobile object such as a vehicle or may be formed on a cloud. The user terminal 60 is a user's portable information terminal. The user terminal 60 may be constituted by a computer including a processor such as a central processing unit [CPU], a memory such as a read only memory [ROM], a random-access memory [RAM], a communication device, and an interface including a display or a touch panel.

The vehicle dispatch server 10 grasps the status of the autonomous driving vehicles 2A, 2B, 2C, by a wireless communication network N. The vehicle dispatch server 10 dispatches a plurality of the autonomous driving vehicles to point of dispatch P. The vehicle dispatch server 10 may manage by assigning a unique identification number to each autonomous driving vehicles. The wireless communication network N may include an internet line or a line for a portable information terminal, and is not particularly limited as long as it can perform wireless communication. Details of the point of dispatch P will be described later.

The vehicle dispatch server 10 may dispatch the autonomous driving vehicles (remote assistance vehicles) that perform an autonomous driving along with remote assistance by a remote operator. A remote operator is a person providing remote assistance to the autonomous driving vehicle. The remote assistance is an instruction regarding the travel of the autonomous driving vehicle from a remote operator. The remote assistance includes instructions to progress the autonomous driving vehicle and to stop the autonomous driving vehicle. The remote assistance may include the autonomous driving vehicle lane change indication. The remote assistance may also include an instruction to the autonomous driving vehicle regarding the entry and exit of the occupant (for example, an instruction to automatically open and close the door or an instruction to start the voice guidance of the exit). It can be referenced Japanese Patent Application No. 2019-146571 for details on remote assistance and remote servers.

The above-described remote assistance is an example, and the remote assistance is not limited to an instruction to proceed or stop. The remote assistance may include remote manipulation of the autonomous driving vehicle by the remote operator R. In the remote control, for example, the accelerator operation of the remote operator R is reflected in the acceleration of the autonomous driving vehicle. Remote assistance may not include remote manipulation of the autonomous driving vehicle by the remote operator R.

Figure 2:
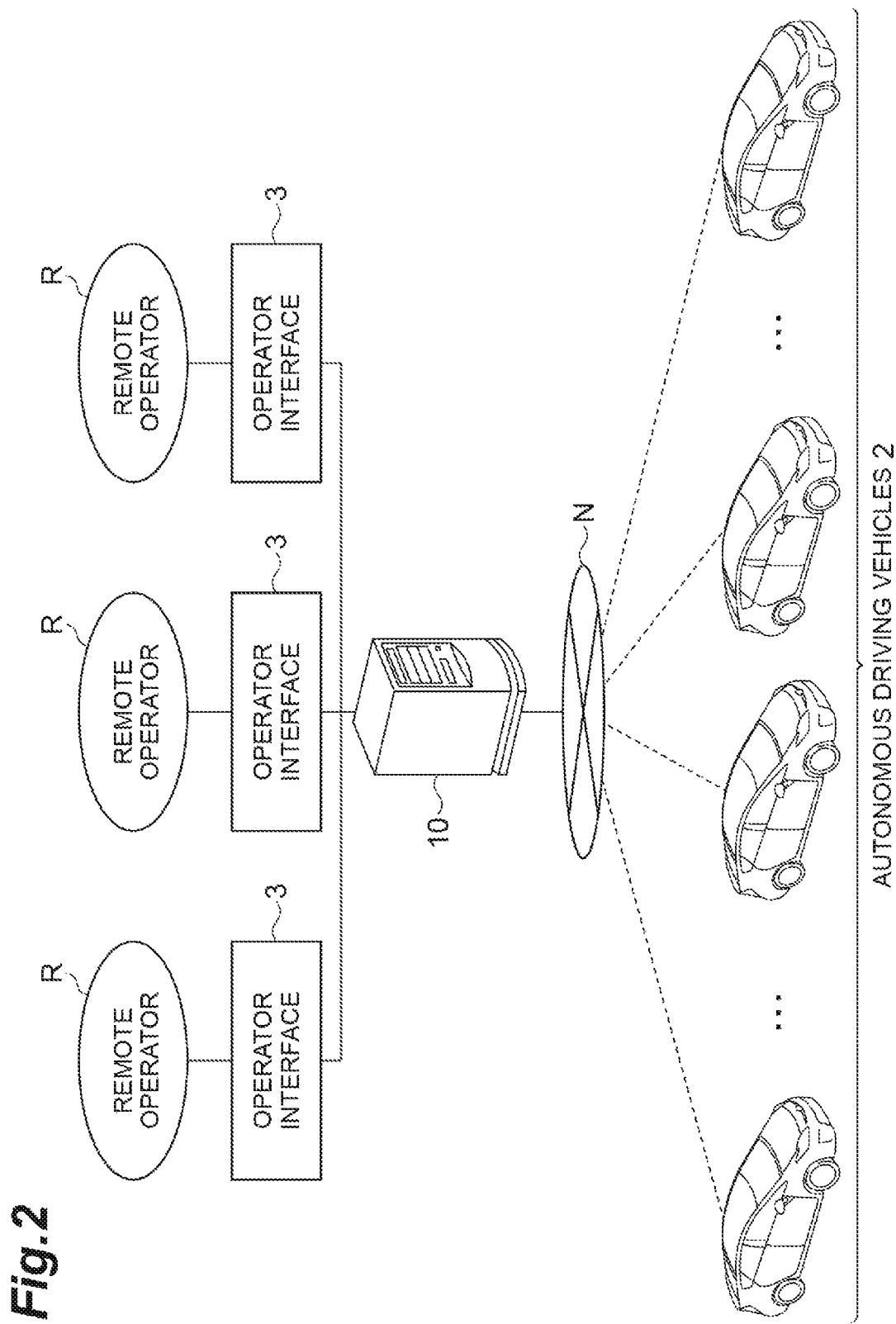
FIG. 2 is a diagram illustrating for explaining remote assistance to an autonomous driving vehicle.

FIG. 2 is a diagram for explaining the remote assistance to the autonomous driving vehicle. As illustrated in FIG. 2, the vehicle dispatch server 10 may also functions as a remote assistance server for transmitting the remote assistance of the remote operator R to the autonomous driving vehicle 2. The remote operator R transmits the remote assistance to the autonomous driving vehicle 2 as the remote assistance object by transmitting the remote assistance to the vehicle dispatch server 10 through the operator interface 3. The number of remote operators R may be one or more. At the vehicle dispatch server 10, remote assistance may be input to the remote operator R in response to a remote assistance request from the autonomous driving vehicle 2. The remote assistance server may be a server separate from the vehicle dispatch server 10.

Configuration of the Autonomous Driving Vehicle

Figure 3:
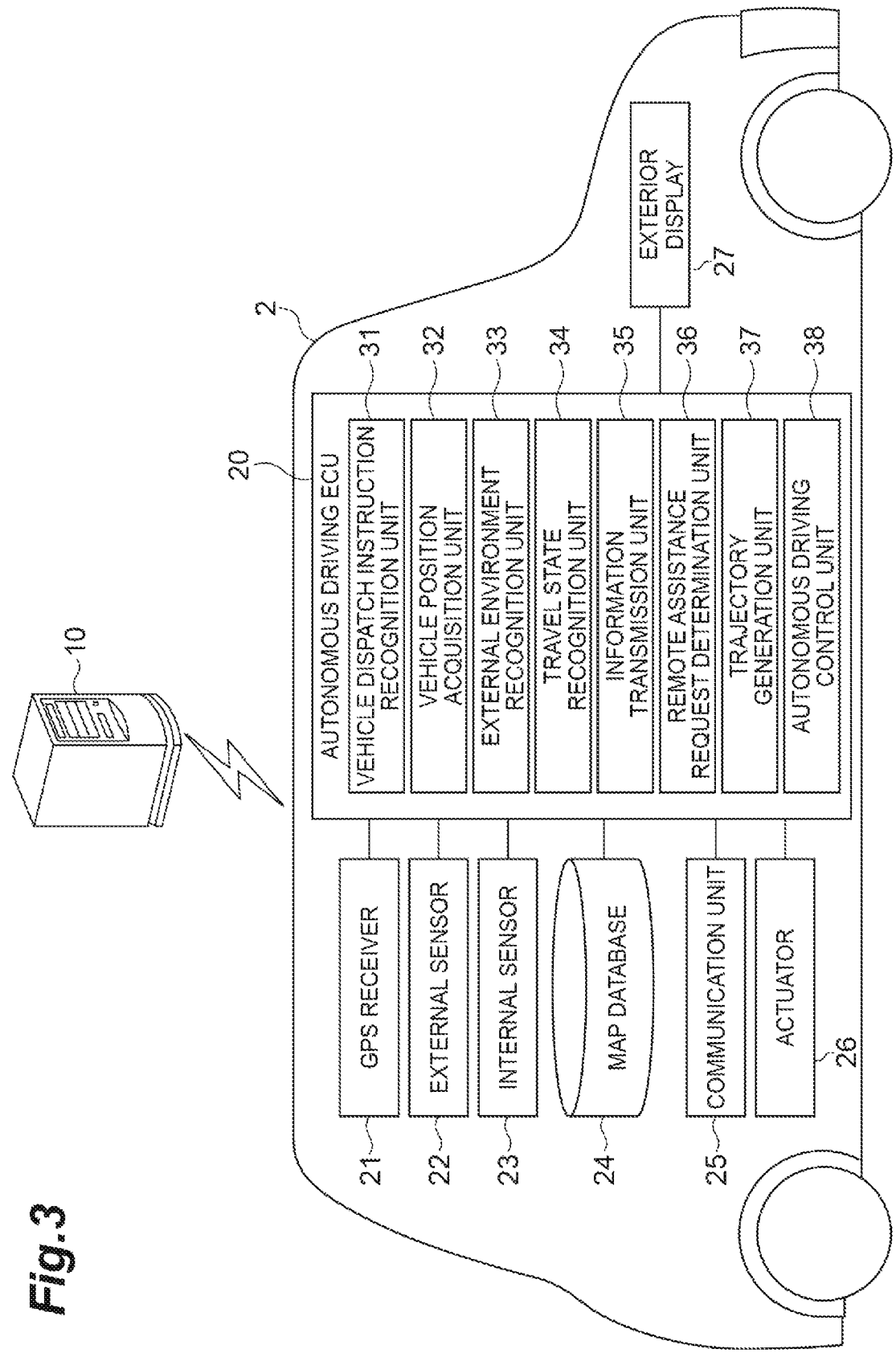
FIG. 3 is a block diagram illustrating an example of the configuration of autonomous driving vehicle.

First, an example of the configuration of the autonomous driving vehicle 2 will be described. FIG. 3 is a block diagram illustrating an example of the configuration of autonomous driving vehicle 2. As illustrated in FIG. 3, the autonomous driving vehicle 2 may include an autonomous driving electronic control unit [autonomous driving ECU] 20. The autonomous driving ECU 20 may be an electronic control unit having a processor such as a CPU, a memory such as a ROM or a RAM. In the autonomous driving ECU 20, various functions are realized by loading a program recorded in a ROM into a ram and executing the program loaded into the ram by a CPU. The autonomous driving ECU 20 may comprise a plurality of electronic units.

The autonomous driving ECU 20 is connected to a global positioning system receiver 21, an external sensor 22, an internal sensor 23, map database 24, a communication unit 25, an actuator 26 and an exterior display 27.

The GPS receiver 21 measures the location of the autonomous driving vehicle 2 (e.g., latitude and longitude of the autonomous driving vehicle 2) by receiving signals from 3 or more GPS-satellites. GPS receiver 21 transmits the measured position information of the autonomous driving vehicle 2 to autonomous driving ECU 20.

The external sensor 22 is an on-vehicle sensor for detecting the external environment of the autonomous driving vehicle 2. The external sensor 22 includes at least a camera. The camera is an imaging device for imaging the external environment of the autonomous driving vehicle 2. The autonomous driving vehicle 2 may be equipped with an external camera for the remote operator R.

The external sensor 22 may include a radar sensor. The radar sensor is a detection device that detects an object around the autonomous driving vehicle 2 using radio waves (e.g., millimeter waves) or light. The radar sensor includes, for example, a millimeter-wave radar or a light detection and ranging [LIDAR]. The radar sensor detects an object by transmitting radio waves or light around the autonomous driving vehicle 2 and receiving the radio waves or light reflected by the object. The external sensor 22 may include a sonar sensor that detects sounds external to the autonomous driving vehicle 2.

The internal sensor 23 is an on-vehicle sensor for detecting the running state of the autonomous driving vehicle 2. The internal sensor 23 includes a vehicle speed sensor, an accelerometer sensor, and a yaw rate sensor. The vehicle speed sensor is a detector for detecting the speed of the autonomous driving vehicle 2. The acceleration sensor is a detector for detecting an acceleration of the autonomous driving vehicle 2. The acceleration sensor includes, for example, a longitudinal acceleration sensor for detecting an acceleration in the longitudinal direction of the autonomous driving vehicle 2. The acceleration sensor may include a lateral acceleration sensor that detects a lateral acceleration of the autonomous driving vehicle 2. The yaw rate sensor is a detector that detects the yaw rate (rotational angular velocity) around the vertical axis of the center of gravity of the autonomous driving vehicle 2. As the yaw rate sensor, for example, a gyro sensor can be used.

The map database 24 is a database for recording map information. The map database 24 is formed in a recording device such as a hard disk drive [HDD] mounted on the autonomous driving vehicle 2. The map information includes, for example, road position information, road shape information (for example, curvature information), position information of intersections and branch points, and the like. The map information may include traffic regulation information such as a legal maximum speed associated with the position information. The map information may include target information used to acquire the position information of the autonomous driving vehicle 2. The target may include road signs, road markings, traffic lights, utility poles. The map information may include position information of bus stops. The map database 24 may be configuration as a server capable of communicating with the autonomous driving vehicle 2.

The communication unit 25 is a communication device that controls wireless communication with the outside of the autonomous driving vehicle 2. The communication unit 25 transmits and receives various kinds of information with the vehicle dispatch server (remote assistance server) 10 via the wireless communication network N.

The actuator 26 is a device used to control the autonomous driving vehicle 2. The actuator 26 includes at least a drive actuator, a brake actuator, and a steering actuator. The drive actuator controls the amount of air supplied to the engine (throttle opening) in accordance with a control signal from the autonomous driving ECU 20 to control the driving force of the autonomous driving vehicle 2. When autonomous driving vehicle 2 is a hybrid vehicle, a control signal from the autonomous driving ECU 20 is input to a motor serving as a power source in addition to the amount of air supplied to the engine to control the driving force. When the autonomous driving vehicle 2 is an electric vehicle, a control signal from the autonomous driving ECU 20 is inputted to a motor serving as a power source to control the driving force. The motor as a power source in these cases constitutes the actuator 26. The exterior display 27 may be a projector to the window of the autonomous driving vehicle 2 or an image display device on an outer surface of the autonomous driving vehicle 2.

The brake actuator controls the brake system in accordance with a control signal from the autonomous driving ECU 20 to control the braking force applied to the wheels of the vehicle. As the brake system, for example, a hydraulic brake system can be used. The steering actuator controls driving of an assist motor for controlling steering torque in the electric power steering system in accordance with a control signal from the autonomous driving ECU 20. Thus, the steering actuator controls the steering torque of the autonomous driving vehicle 2.

Next, an example of the functional configuration of the autonomous driving ECU 20 will be described. The autonomous driving ECU 20 includes a vehicle dispatch instruction recognition unit 31, a vehicle position acquisition unit 32, an external environment recognition unit 33, a travel state recognition unit 34, an information transmission unit 35, a remote assistance request determination unit 36, a trajectory generation unit 37, and an autonomous driving control unit 38. Some functions of the autonomous driving ECU 20 may be executed by a server capable of communicating with the autonomous driving vehicle 2. The server that can communicate may include the vehicle dispatch server 10.

The vehicle dispatch instruction recognition unit 31 recognizes the dispatch instruction which is the instruction relating to the dispatch transmitted from the vehicle dispatch server 10. The position information of the point of dispatch P is included in the dispatch instruction. If the vehicle dispatch instruction has already been determined, the vehicle dispatch route information may be included.

The vehicle position acquisition unit 32 acquires the position information (position on the map) of the autonomous driving vehicle receiving unit based on the position information of the GPS receiver 21 and the map information of the map database 24. The vehicle position acquisition unit 32 may acquire the position information of the autonomous driving vehicle 2 by the SLAM (simultaneous localization and mapping) technique using the target information included in the map information of the map database 24 and the detection result of the external sensor 22. The vehicle position acquisition unit 32 may recognize the lateral position of autonomous driving vehicle 2 with respect to the lane (the position of autonomous driving vehicle 2 in the lane width direction) from the positional relationship between the lane marking line and the autonomous driving vehicle 2, and include it in the position information. In addition, the vehicle position acquisition unit 32 may acquire the position information of the autonomous driving vehicle 2 by the method of known.

The external environment recognition unit 33 recognizes the external environment of the autonomous driving vehicle 2 based on the detection result of the external sensor 22. The external environment includes the relative positions of the surrounding objects to the autonomous driving vehicle 2. The external environment may include the relative velocity and direction of movement of the surrounding object relative to the autonomous driving vehicle 2. The external environment may include types of objects such as other vehicles, pedestrians, bicycles, etc. The type of the object can be identified by a known method such as pattern matching. The external environment may include the result of lot line recognition (lane line recognition) around the autonomous driving vehicle 2. The external environment may include a recognition result of the lighting state of the signal. For example, the external environment recognition unit 33 can recognize the lighting state of the signal ahead of the autonomous driving vehicle 2 (e.g., whether the lighting state is a passable lighting state or a pass-prohibited lighting state) based on the image of the camera of the external sensor 22.

The traveling state recognition unit 34 recognizes the traveling state of the autonomous driving vehicle 2 based on the detection result of the internal sensor 23. Driving conditions include vehicle speed of the autonomous driving vehicle 2, accelerations of the autonomous driving vehicle 2, and yaw rate of the autonomous driving vehicle 2. Specifically, the traveling state recognition unit 34 recognizes the vehicle speed of the autonomous driving vehicle 2 based on the vehicle speed information of the vehicle speed sensor. The traveling state recognition unit 34 recognizes the acceleration of the autonomous driving vehicle 2 based on the vehicle speed information of the acceleration sensor. The traveling state recognition unit 34 recognizes the direction of the autonomous driving vehicle 2 based on the yaw rate information of the yaw rate sensor.

The information transmission unit 35 transmits vehicle information relating to the status of the autonomous driving vehicle 2 to the vehicle dispatch server 10 via the communication unit 25. The vehicle information includes at least the position information of the autonomous driving vehicle 2. The vehicle information may include information on the remaining fuel (remaining amount of gasoline, remaining amount of battery, and the like) of the autonomous driving vehicle 2 or information on the mileage predicted from the remaining fuel.

The vehicle information may include the autonomous driving vehicle 2 status, such as during user pickup, during luggage transportation, or for other reasons, that the vehicle cannot be dispatched. The vehicle information may include information on the remaining number of passengers, and may include information on the loading capacity of the baggage (or the loading upper limit and the current loading capacity). The vehicle information may include the external environment (surrounding traffic information) of the autonomous driving vehicle 2 recognized by the external environment recognition unit 33. The vehicle information may include the traveling state of the autonomous driving vehicle 2 recognized by the traveling state recognition unit 34.

The remote assistance request determination unit 36 determines whether or not autonomous driving vehicle 2 should request remote assistance from the remote operator R. The remote assistance request determination unit 36 determines whether to request remote assistance based on at least one of the position information of the autonomous driving vehicle 2 acquired by the vehicle position acquisition unit 32 and the map information of the map database 24, the external environment recognized by the external environment recognition unit 33, and the course generated by the trajectory generation unit 37 described later.

The remote assistance request determination unit 36 determines that the remote assistance should be requested when the autonomous driving vehicle 2 enters the remote assistance request status. The remote assistance request status is a status that is preset as a status in which the autonomous driving vehicle should request remote assistance from the remote operator R.

The remote assistance request status may include the following conditions. The conditions include the autonomous driving vehicle 2 turning right at the intersection, the autonomous driving vehicle 2 entering the intersection with or without a traffic light, and the autonomous driving vehicle 2 passing through the traffic light (e.g., passes through a traffic light corresponding to a pedestrian crossing on the way), the autonomous driving vehicle 2 starting changing lanes, the autonomous driving vehicle 2 entering a construction section, the autonomous driving vehicle 2 entering a railroad crossing, the autonomous driving vehicle stopping at the point of dispatch P or the destination.

The autonomous driving vehicle 2 does not necessarily request remote assistance when turning right at the intersection. The autonomous driving vehicle 2 may automatically turn right at an intersection under certain conditions (e.g., no oncoming vehicle is detected) without requesting remote assistance. In a country or area of right-hand traffic, the autonomous driving vehicle 2 may turn left at the intersection instead of turning right at the intersection.

The remote assistance request determination unit 36 may determine that remote assistance should be requested when the autonomous driving vehicle 2 enters an intersection or turns right at an intersection. The remote assistance request determination unit 36 may determine that the remote assistance should be requested when the autonomous driving vehicle 2 starts changing lanes to reach the destination. When the remote assistance request determination unit 36 determines that the remote assistance should be requested, it requests the remote assistance by the remote operator R from the vehicle dispatch server 10. The remote assistance request includes, for example, identification information of the autonomous driving vehicle 2.

The trajectory generation unit 37 generates a trajectory used for the autonomous driving of the autonomous driving vehicle 2. The trajectory generation unit 37 generates the trajectory of the autonomous driving based on the route, the map information, the position information, the external environment, and the traveling state of the vehicle. The trajectory corresponds to the travel plan of autonomous driving. The trajectory will be described in detail later.

The trajectory includes the path along which the vehicles will travel in autonomous driving and the vehicle speed plan in autonomous driving. The path is a locus on which vehicles in the autonomous driving are to travel on the dispatch route. The path can be steering angle plan data of the steering angle change of the autonomous driving vehicle 2 corresponding to the position on the vehicle dispatch route. The position on the dispatch route is, for example, a set longitudinal position set at predetermined intervals (for example, 1 m) in the traveling direction of the dispatch route. The steering angle plan is data in which a target steering angle is associated with each set longitudinal position.

The trajectory generation unit 37 generates a trajectory along which the autonomous driving vehicle 2 travels, for example, based on the vehicle dispatch route, the map information, the external environment of the autonomous driving vehicle 2, and the traveling state of the autonomous driving vehicle 2. The trajectory generation unit 37 may generate a route such that the autonomous driving vehicle 2 passes through the center of the lane (the center in the lane width direction) included in the dispatch route.

The vehicle speed plan is data in which a target vehicle speed is associated with each set longitudinal position, for example. The set longitudinal position may be set based on the travel time of the autonomous driving vehicle 2 instead of the distance. The set longitudinal position may be set as an arrival position one seconds after the vehicle and an arrival position two seconds after the vehicle. In this case, the vehicle speed plan can also be expressed as data corresponding to the travel time.

The trajectory generation unit 37 generates a vehicle speed plan based on the path and the traffic regulation information such as a legal maximum speed in the map information. Instead of the legal maximum speed, a speed preset for a position or section on the map may be used. When the autonomous driving vehicle 2 is an autonomous driving bus, the trajectory generation unit 37 may generate a local speed plan based on the operation plan including the arrival time determined at the stop, taking the stop time at the stop into consideration. The trajectory generation unit 37 generates a trajectory of the autonomous driving from the path and the vehicle speed plan. Note that the trajectory of generating a trajectory in the trajectory generating unit 37 is not limited to the above-described content, and the known method for autonomous driving can be adopted. The same applies to the content of the trajectory.

For example, in a situation where the autonomous driving vehicle 2 makes a right turn at an intersection, the trajectory generation unit 37 generates a trajectory where the autonomous driving vehicle 2 makes a right turn at the intersection so as to correspond to remote assistance for starting a right turn. The trajectory generation unit 37 may update the trajectory in accordance with changes in the external environment until the remote assistance is received. Further, when there is remote assistance for switching from turning right at the intersection to going straight at the intersection, the trajectory generation unit 37 may generate a trajectory to go straight at the intersection in advance.

The autonomous driving control unit 38 executes autonomous driving of the autonomous driving vehicle 2. The autonomous driving control unit 38 executes the autonomous driving of the autonomous driving vehicle 2 based on the external environment of the autonomous driving vehicle 2, the running state of the autonomous driving vehicle 2, and the trajectory generated by the trajectory generation unit 37. The autonomous driving control unit 38 transmits a control signal to the actuator 26, thereby performing autonomous driving of the autonomous driving vehicle 2.

The autonomous driving control unit 38 waits for reception of the remote assistance from the vehicle dispatch server 10 when the remote assistance request determination unit 36 requests the remote assistance from the vehicle dispatch server 10. The autonomous driving control unit 38 maintains the stop state until the remote assistance is received when the autonomous driving control unit 38 requests the remote assistance after the autonomous driving vehicle 2 stops. The autonomous driving control unit 38 executes autonomous driving (lane change, etc.) when it receives the remote assistance.

Configuration of Vehicle Dispatching Server

Figure 4:
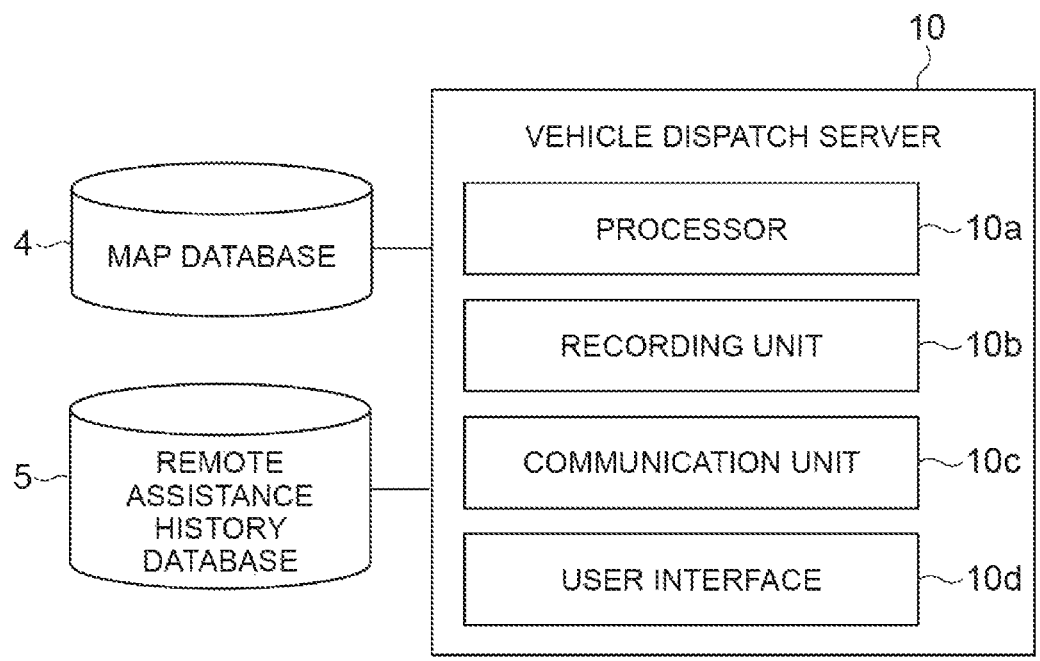
FIG. 4 is a block diagram illustrating an example of the hardware configuration of the vehicle dispatch server.

Next, the configuration of the vehicle dispatch server 10 will be described. FIG. 4 is a block diagram illustrating an example of the hardware configuration of the vehicle dispatch server 10. The map database 4 and the remote assistance history database 5 are connected to the vehicle dispatch server 10.

The map database 4 is a database for recording map information. The map information includes road position information, road shape information (e.g., curvature information), position information of intersections and branch points, and the like. More detailed map information than the map database 24 of the autonomous driving vehicle 2 may be stored in the map database 4.

The remote assistance history database 5 is a database for recording the history of the request frequency for which the remote assistance is requested from the autonomous driving vehicle 2. The remote assistance history database 5 may also record the contents of the remote assistance performed by the remote operator R.

In the remote assistance history database 5, for example, the request frequency of the remote assistance is recorded for each section of the lane. There is no particular limitation on how the section is determined. The request frequency of the remote assistance for each section may be the frequency at which the remote assistance is requested to lane change to avoid approaching a vehicle parked on the shoulder of the section. The request frequency of the remote assistance for each section may be the frequency at which the remote assistance is requested to lane change to avoid an offset exceeding the oncoming lane. The higher the probability of a parking vehicle or the like being present, the higher the frequency of requests for remote assistance. The request frequency of the remote assistance for each section of the lane may be the number of requests of the remote assistance for the number of times the autonomous driving vehicle 2 has traveled in the section.

The remote assistance history database 5 may record the request frequency of the autonomous driving vehicle 2 when turning right at each intersection. When the autonomous driving vehicle 2 has a function of automatically turning right at an intersection without requesting remote assistance under certain conditions (for example, when an oncoming vehicle is not detected) (self-determination right turn function), a remote assistance request is not always made at the time of turning right at the intersection. The higher the traffic volume of the vehicle and the higher the probability of waiting for an oncoming vehicle when turning right at the intersection, the higher the frequency of requests when turning right at the intersection. The request frequency of the remote assistance at the time of turning right at the intersection can be, for example, the number of requests of the remote assistance out of the number of times of turning right at the intersection of the autonomous driving vehicle 2.

The request frequency described above may be recorded in association with time. The request frequency is recorded in association with time zones such as early morning, daytime, evening, and night. The request frequency may be recorded in association with traffic information such as vehicle density, or may be recorded in association with weather.

As illustrated in FIG. 4, the vehicle dispatch server 10 is configuration as a general computer having a processor 10*a*, a recording unit 10*b*, a communication unit 10*c*, and a user interface 10*d*. In this case, the user means a user (administrator or the like) of the vehicle dispatch server 10.

The processor 10*a* controls the vehicle dispatch server 10 by operating various operating systems. The processor 10*a* is an arithmetic unit such as a CPU including a control unit, an arithmetic unit, a register, etc. The processor 10*a* integrates the recording unit 10*b*, the communication unit 10*c*, and the user interface 10*d*. The recording unit 10*b* includes at least one of a memory and a storage. The memory is a recording medium such as ROM or RAM. The storage is a recording medium such as an HDD.

The communication unit 10*c* is a communication device for performing communication via the wireless communication network N. The communication unit 10*c* may be a network device, a network controller, a network card, or the like. The user interface 10*d* is an input/output unit of the vehicle dispatch server 10 for a user such as an administrator. The user interface 10*d* includes an output device such as a display, a speaker, and an input device such as a touch panel. The vehicle dispatch server 10 is not necessarily provided in the facility, and may be mounted on a moving body such as a vehicle.

Figure 5:
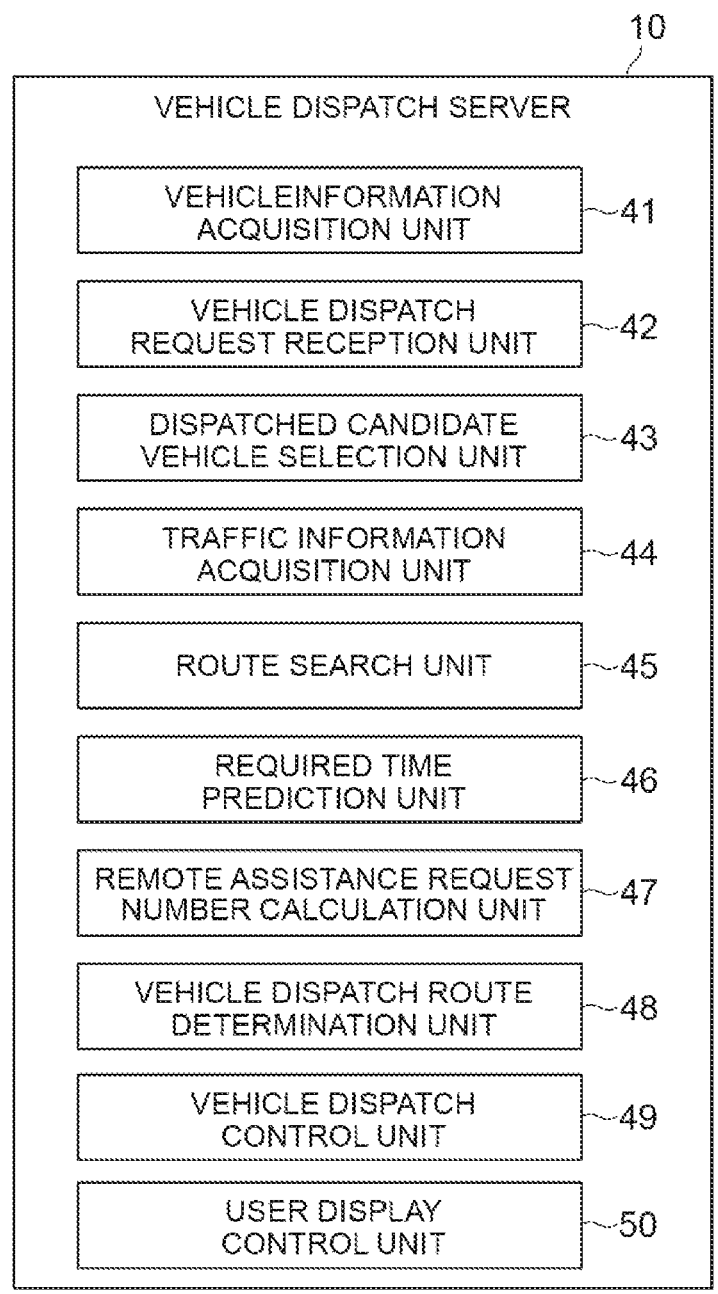
FIG. 5 is a block diagram illustrating an example of the functional configuration of the vehicle dispatch server.

Next, the functional configuration of the vehicle dispatch server 10 will be described. FIG. 5 is a block diagram illustrating an example of the functional configuration of the vehicle dispatch server 10. As illustrated in FIG. 5, the vehicle dispatch server 10 includes a vehicle information acquisition unit 41, a vehicle dispatch request reception unit 42, a dispatched candidate vehicle selection unit 43, a traffic information acquisition unit 44, a route search unit 45, a required time prediction unit 46, a remote assistance request number calculation unit 47, a vehicle dispatch route determination unit 48, a vehicle dispatch control unit 49, and a user display control unit 50.

The vehicle information acquisition unit 41 acquires vehicle information from the autonomous driving vehicles 2, which is an object of dispatch. The object of dispatch may include all autonomous driving vehicles 2 managed by the vehicle dispatch server 10, or may not include the autonomous driving vehicles 2 on which the user is on board. For example, when the user permits the sharing of the vehicle, the autonomous driving vehicles 2 in which the user is on the vehicle may be included in the object of dispatch.

The vehicle information acquisition unit 41 may acquire the vehicle information by issuing an information provision instruction to the autonomous driving vehicles 2 to be dispatched, or may acquire the vehicle information by transmitting the vehicle information from the autonomous driving vehicles 2 at regular intervals.

The vehicle dispatch request receiving unit 42 receives a vehicle dispatch request from the user. The vehicle dispatch request may be transmitted from the user terminal 60. The vehicle dispatch request may be made from a server or the like for reserving the vehicle dispatch. The vehicle dispatch request may be a ride request for a user to ride, or a pickup request for a user to request delivery of a parcel. The request for dispatching a vehicle may be a request for specifying the time of advance reservation. The vehicle dispatch request may include at least one of information for specifying the number of passengers, information for specifying the type of vehicle, information for specifying the new vehicle, and information for specifying the color of the vehicle.

The vehicle dispatch request receiving unit 42 sets the point of dispatch P for dispatching at least one of autonomous driving vehicle 2 based on the received vehicle dispatch request. The point of dispatch P is a boarding point for a user to board if the type of the received vehicle dispatch request is a boarding request. The point of dispatch P is a pickup point for the user to deposit the luggage at the autonomous driving vehicle 2 when the type of the received vehicle dispatch request is a pickup request. The point of dispatch P may be determined by the user's designation, or may be set based on the position information of the user terminal 60 from a plurality of possible boarding points set in advance on the map. There is no particular limitation on how to decide the point of dispatch P.

The dispatched candidate vehicle selection unit 43 will select at least one of dispatched candidate vehicles. The dispatched candidate vehicle is a candidate vehicle to be dispatched to the point of dispatch P. The dispatched candidate vehicle selection unit 43 selects multiple dispatched candidate vehicles based on the location of the point of dispatch P and the positions of autonomous driving vehicles 2. The dispatched candidate vehicle selection unit 43 selects, for example, the autonomous driving vehicles 2 located within a certain distance from the point of dispatch P as the dispatched candidate vehicles.

The dispatched candidate vehicle selection unit 43 may set the maximum number of dispatched candidate vehicles. When the number of the autonomous driving vehicle 2 located within a certain distance from the point of dispatch P exceeds a predetermined upper limit, the number of dispatched candidate vehicles is limited to be equal to or less than the upper limit. The dispatched candidate vehicle selection unit 43 may select the dispatched candidate vehicles in order of proximity to point of dispatch P, thereby narrowing down the number of dispatched candidate vehicles to be equal to or less than the upper limit of the number. The upper limit of the number is two or more.

Alternatively, the dispatched candidate vehicle selection unit 43 may be configured to select the dispatched candidate vehicles up to the upper limit of the number of units in order of proximity to the point of dispatch P. The dispatched candidate vehicle selection unit 43 may use the distance on the road instead of the linear distance. The autonomous driving vehicles 2 may exclude from dispatched candidate vehicles that is not within the same area as the point of dispatch P. The area is a preset area on the map. The area may be a city, town or village on the map.

The dispatched candidate vehicle selection unit 43 may execute narrowing-down of the dispatched candidate vehicles based on the remaining fuel of the autonomous driving vehicle 2 or the mileage of the autonomous driving vehicle 2. For example, the dispatched candidate vehicle selection unit 43 excludes from dispatched candidate vehicles the autonomous driving vehicle 2 where the remaining fuel is less than the remaining fuel threshold or where the mileage is less than the mileage threshold. Hereinafter, the threshold values used in the description including the residual fuel threshold value and the drivable distance threshold value mean threshold values of predetermined values.

The dispatched candidate vehicle selection unit 43 selects the autonomous driving vehicle 2 satisfying the user's request as dispatched candidate vehicle if at least one of the information for specifying the number of passengers, the information for specifying the type of vehicle, the information for specifying the new vehicle, the color of the vehicle, and the like is included in the vehicle dispatch request.

The traffic information acquisition unit 44 acquires traffic information to be used for determining a vehicle dispatch route. The traffic information includes, for example, vehicle density. The traffic information may include congestion information. The traffic information may include information on road construction sections. The traffic information acquisition unit 44 may acquire traffic information around the dispatched candidate vehicle by acquiring vehicle information from the dispatched candidate vehicle. The traffic information acquisition unit 44 may acquire traffic information around the point of dispatch P by communication with a public organization or a private traffic information aggregation server. The traffic information acquisition unit 44 may acquire traffic information around the point of dispatch P by providing information from the autonomous driving vehicle 2 running in the vicinity of the point of dispatch P (for example, the autonomous driving vehicle not subject to the dispatch while the user is on board).

The route search unit 45 searches for a route for the dispatched candidate vehicle to get to the point of dispatch P. The route search unit 45 searches at least one route per one dispatched candidate vehicle. The route search unit 45 may perform a route search based on the position information of the point of dispatch P and the dispatched candidate vehicle and the map information of the map database 4. The route search unit 45 may perform a route search by recognizing the travelling lane of dispatched candidate vehicle or the traveling direction of dispatched candidate vehicle.

The route search unit 45 may search for routes until the number of routes reaches a preset maximum in the order of the shortest route lengths. The route search method is not particularly limited, and the method of known can be adopted.

Figure 6:
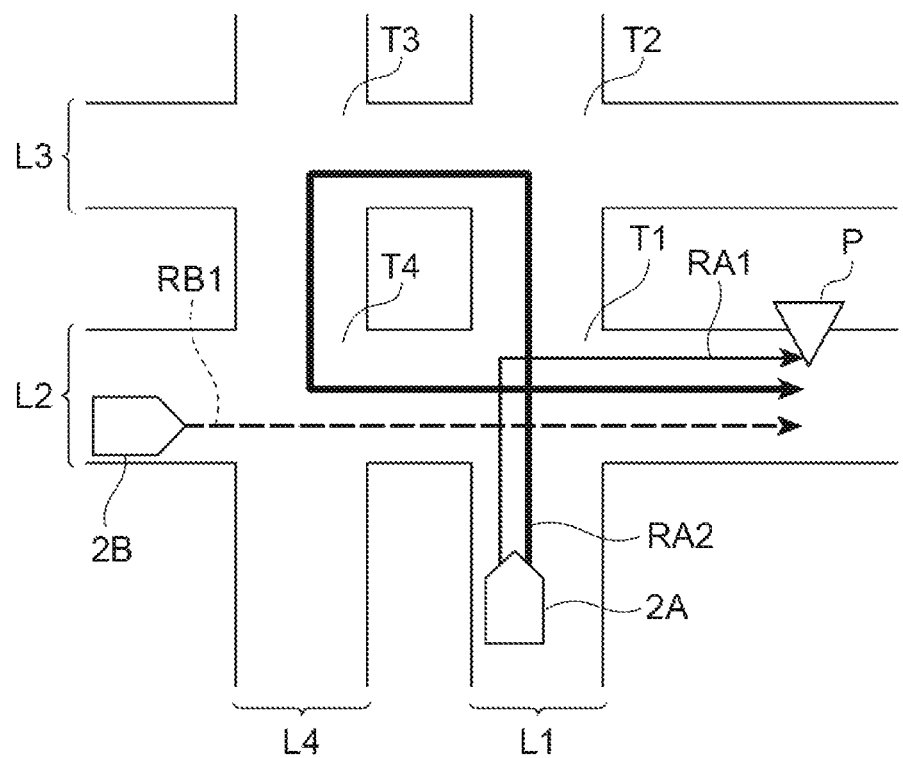
FIG. 6 is a diagram illustrating an example of a situation where a plurality of routes of the dispatched candidate vehicle exist.

FIG. 6 is a diagram illustrating an example of a situation where a plurality of routes of the dispatched candidate vehicle exist. FIG. 6 shows the dispatched candidate vehicle 2A, the dispatched candidate vehicle 2B, the point of dispatch P, and the roads L1-L4. The roads L1-L4 are arranged in a grid pattern and form four intersections T1-T4. The road L1 is a road on which the dispatched candidate vehicle 2A is running, and intersects the road L2 at the intersection T1 and also intersects the road L3 at the intersection T2 located in the back of the intersection T1. The road L2 intersects the road L4 (a road extending in parallel with the road L1) at the intersection T1, and intersects the road L1 at the intersection T1. The point of dispatch P is located on the right side of the dispatched candidate vehicle 2A on the road L2. The road L3 intersects the road L4 at the intersection T4 and intersects the road L1 at the intersection T1.

In the situation illustrated in FIG. 6, the route search unit 45 searches the route RA1 and the route RA2 as the route by which the dispatched candidate vehicle 2A reaches the point of dispatch P. The route RA1 is a route from the road L1 to the point of dispatch P on the road L2 by turning right at the intersection T1. The route RA2 is a route that goes straight through the intersection T1, turns left at the intersection T2, and proceeds on the road L3, then turns left at the intersection T3 and proceeds on the road L4, and then turns left at the intersection T4 to enter the road L2, and goes straight through the intersection T1 to arrive at the point of dispatch P. Further, the route search unit 45 searches for the route RB1 as the route by which the dispatched candidate vehicle 2B reaches point of dispatch P. The route RB1 is a route to go straight through the intersection T4 and the intersection T1 along the road L2 on which the dispatched candidate vehicle 2B runs, and arrive at the point of dispatch P.

The route search unit 45 may exclude at least one route from the route search result so as not to satisfy the duplication condition when there are two dispatched candidate vehicles whose routes satisfy the duplication condition set in advance.

The duplication condition is satisfied, for example, when the duplication distance of each dispatched candidate vehicle routes is equal to or greater than the duplication distance threshold. The duplication condition may be satisfied when the ratio of the duplication distance with the other dispatched candidate vehicle routes to the total length of one dispatched candidate vehicle route is equal to or greater than the duplication ratio threshold. The duplication distance threshold and the duplication ratio threshold are not particularly limited.

The route search unit 45 preferentially excludes, for example, the route having the longer total length from the 2 routes satisfying the duplication condition. The route search unit 45 may preferentially exclude the longer required time by using the required time predicted by the required time prediction unit 46 described later. The route search unit 45 may use the remote assistance request number calculated by the remote assistance request number calculating unit 47 described later to preferentially exclude the route has larger remote assistance request number. If there is the dispatched candidate vehicle that have no route to the dispatch point P when one route is excluded, the route search unit 45 may preferentially exclude the dispatched candidate vehicle which has the other route. The route search unit 45 may exclude two routes determined to satisfy the duplication condition.

In the situation illustrated in FIG. 6, the route RA1 of the dispatched candidate vehicle 2A and the route RB1 of the dispatched candidate vehicle 2B do not satisfy the duplication condition, but the route RA2 of the dispatched candidate vehicle 2A and the route RB1 of the dispatched candidate vehicle 2B satisfy the duplication condition. In this case, the route search unit 45 excludes the route RA2 of the dispatched candidate vehicle 2A, the dispatched candidate vehicle 2A and 2B are prevented from traveling more than a certain distance on the overlapped route. The route search unit 45 may exclude the range of a certain distance from point of dispatch P from the determination target of the duplication condition of the route.

If the dispatched candidate vehicle exists which eliminates routes to the point of dispatch P by excluding those that satisfy the duplication condition, the route search unit 45 may exclude said vehicles from the dispatched candidate vehicles.

Figure 7:
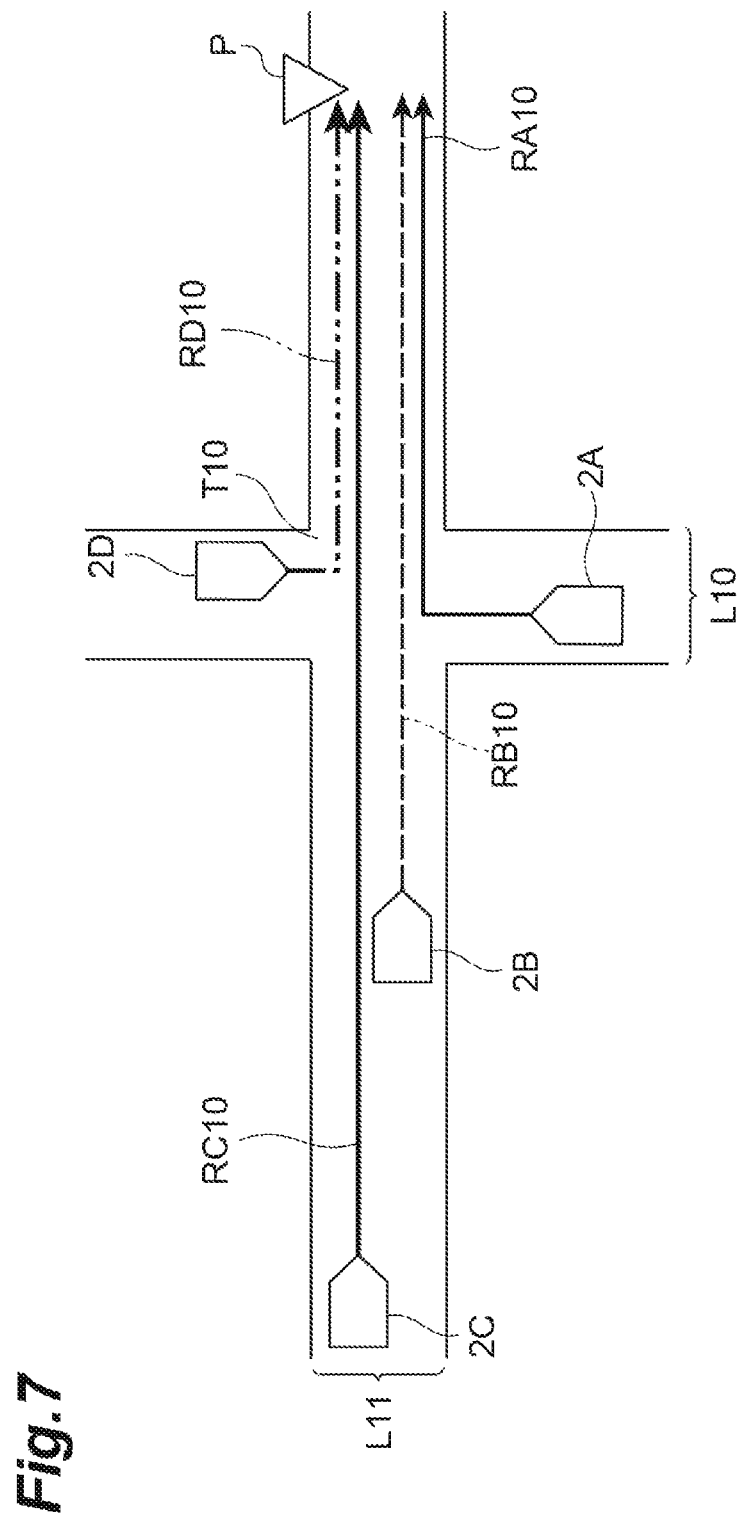
FIG. 7 is a diagram illustrating an example of a situation where there is a plurality of the dispatched candidate vehicles whose routes satisfy the duplication condition.

FIG. 7 is a diagram illustrating an example of a situation where there are a plurality of dispatched candidate vehicles whose routes satisfy the duplication condition. FIG. 7 shows the road L10 and the road L11 intersecting at the intersection T10, the route RA10 of the dispatched candidate vehicle 2A, the route RB10 of the dispatched candidate vehicle 2B, the route RC10 of the dispatched candidate vehicle 2C, and the route RD10 of the dispatched candidate vehicle 2D. The dispatched candidate vehicles 2A and 2D are opposite to each other across the intersection T10, and the routes RA10 and RD10 are the routes that merge at the intersection T10 and go to the point of dispatch P on the road L11. The dispatched candidate vehicle 2B and 2C are traveling in the same direction (toward the point of dispatch P) on road L11. The dispatched candidate vehicle 2B is closer to the point of dispatch P. The route RB10 overlaps the route RC10 in all sections.

In the situation illustrated in FIG. 7, the route search unit 45 excludes the route RB10 or the route RC10 because there are the dispatched candidate vehicles 2B and 2C where the routes RB10 and RC10 satisfy the duplication condition. The route search unit 45 may exclude the route RC10. The route search unit 45 removes the dispatched candidate vehicle 2C from the dispatched candidate vehicle because there is no longer a route for the dispatched candidate vehicle 2C to the point of dispatch P due to the exclusion of route RC10.

The route search unit 45 may exclude the routes RA10, RB10, and RC10 other than the shortest route RD10 when the duplication condition is satisfied only in the section from the intersection T10 to point of dispatch P without excluding the range from point of dispatch P to be determined as the duplication condition of the routes. It should be noted that route search unit 45 may not remove dispatched candidate vehicle 2C from the dispatched candidate vehicles, but may output the route leading to point of dispatch P as "0" to a subsequent process. In this case, the vehicle having the route "0" leading to the point of dispatch P may be removed from the dispatched candidate vehicles by the vehicle dispatch route determining unit 48 or the vehicle dispatch control unit 49, which will be described later.

The required time prediction unit 46 predicts the required time by the route searched by the route search unit 45. The required time prediction unit 46 predicts the required time for each route when a plurality of routes is searched.

The required time prediction unit 46 may predict the required time until the dispatched candidate vehicle arrives at the point of dispatch P when the vehicle travels at a constant speed based on the length of the route. In the situation illustrated in FIG. 6, the required time prediction unit 46 predicts that the required time of the route RA1 is shorter than the required time of the route RA2.

The required time prediction unit 46 may predict the required time by adding the addition time set in advance for each event such as turning right at the intersection of the route, passing through the traffic light, crossing the railroad crossing based on the map information. The required time prediction unit 46 may set the addition time such as turning right at the intersection to a different time depending on the position on the map. For example, in the situation illustrated in FIG. 6, when the intersection T1 is an intersection without a traffic light having a large traffic volume on the road L1 and the addition time due to the right turn of the intersection is set as a large time, the required time prediction unit 46 predicts that the required time of the route RA1 is longer than the required time of the route RA2.

The required time prediction unit 46 may predict the required time based on the trajectory (route and vehicle speed plan) of the autonomous driving for each route. The trajectory of the autonomous driving is generated, for example, by the trajectory generation unit 37 at the dispatched candidate vehicle. The trajectory generation unit 37 generates the trajectory of the autonomous driving based on the route, the point of dispatch P, the map information, the external environment of autonomous driving vehicle, and the running state of autonomous driving vehicle.

Instead of the dispatched candidate vehicle, a trajectory of autonomous driving may be generated at the vehicle dispatch server 10. In this case, the required time prediction unit 46 predicts the required time based on the trajectory of the autonomous driving for each route generated at the vehicle dispatch server 10. The path of the autonomous driving generated at the vehicle dispatch server 10 does not necessarily need to be used for the actual autonomous driving at the dispatched candidate vehicle. Alternatively, the trajectory may be generated at other servers instead of the vehicle dispatch server 10.

The method of predicting the required time is not particularly limited, and the method of known can be adopted. For the prediction of the required time, the prediction result of the machine learning based on various travel histories of the autonomous driving vehicles 2 in the past may be used.

The remote assistance request number calculation unit 47 calculates a remote assistance request number on the route, which is the remote assistance request number that the dispatched candidate vehicle requests the remote operator R for remote assistance, based on the route and the previously set remote assistance request conditions.

The remote assistance request condition is a condition that the dispatched candidate vehicle requests remote assistance from the remote operator R. The remote assistance request condition is satisfied when the remote assistance request determination unit 36 determines that the dispatched candidate vehicle (the autonomous driving vehicle 2) is in the remote assistance request status. In the remote assistance request condition, an event such as a lane change on the route may be associated with a count of the remote assistance request number.

For example, the remote assistance request number calculation unit 47 counts one remote assistance request number on the route when a lane change is performed on a route. The case where the lane change is carried out in the route is, for example, a case where the lane change from the left lane to the right lane is required in a multi-lane road in order to arrive at the point of dispatch P.

The remote assistance request number calculation unit 47 may count one remote assistance request number on the route when turning right at an intersection on a route. The remote assistance request number calculation unit 47 may count one remote assistance request number of the route RA2 for making right turns at the intersection. In the situation illustrated in FIG. 6, the remote assistance request number calculation unit 47 may count remote assistance request number of the route RA1 for one right turn at the intersection as "1". The remote assistance request number calculation unit 47 may count remote assistance request number of the route RA2 without making a right turn at the intersection as "0".

Figure 8:
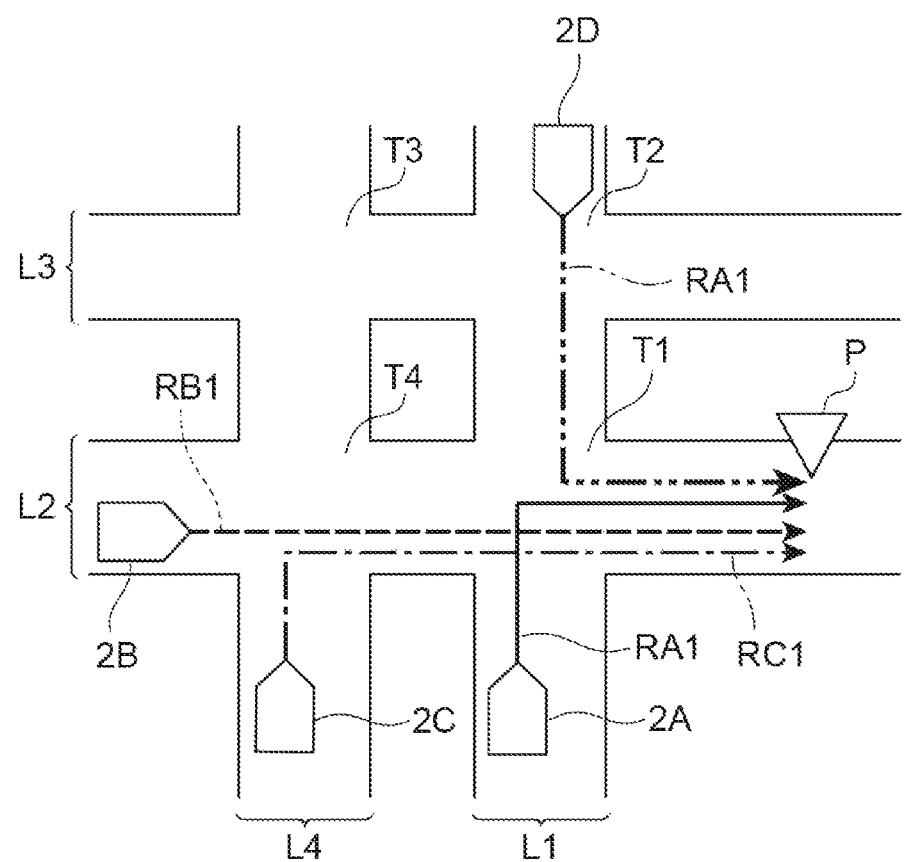
FIG. 8 is a diagram illustrating an example of a situation where the four dispatched candidate vehicles are dispatched.

FIG. 8 is a diagram illustrating an example of a situation where the four dispatched candidate vehicles are dispatched. The road arrangement, the dispatched candidate vehicle 2A, and the dispatched candidate vehicle 2B, is the same as that in FIG. 6. FIG. 8 shows the dispatched candidate vehicle 2C and the dispatched candidate vehicle 2D. The dispatched candidate vehicle 2C is a vehicle traveling on the road L4 in the same direction as the dispatched candidate vehicle 2A. The route RC1 of the dispatched candidate vehicle 2C is a route from the road L4 to the road L2 by turning right at the intersection T4, and then passes through the intersection T1 to the point of dispatch P. The dispatched candidate vehicle 2D is a vehicle running on the road L1 so as to face the dispatched candidate vehicle 2A across the intersection T1. The route RD1 of the dispatched candidate vehicle 2D is a route to enter the road L2 by making a left turn at the intersection T1 and arrive at the point of dispatch P.

In the situation illustrated in FIG. 8, the remote assistance request number calculation unit 47 can calculate, for example, the remote assistance request number of the route RC2 that makes one right turns at the intersection as "1", and the remote assistance request number of the route RD1 that does not make a right turn at the intersection but only makes a left turn as "0".

The remote assistance request number calculation unit 47 does not necessarily have to count one remote assistance request number when the dispatched candidate vehicle has a self-determination right turn function of turning right at an intersection without requesting remote assistance under a certain condition. The remote assistance request number calculation unit 47 may count the remote assistance request number by 0.5 or by 0.7 in consideration of the possibility of remote assistance being requested.

The remote assistance request number calculation unit 47 may determine the count number of the remote assistance requests at the intersection right turn by using the traffic information in the vicinity of the intersection acquired by the traffic information acquisition unit 44. in this case, the route includes position information on the map. For example, the remote assistance request number calculation unit 47 may count the remote assistance request number at the right turn of the intersection as a larger value as the vehicle density near the intersection is larger. Alternatively, the remote assistance request number calculation unit 47 may count the remote assistance request number at the right turn of the intersection as a larger value than when the vehicle density in the vicinity of the intersection is less than the density threshold when the vehicle density in the vicinity of the intersection is equal to or greater than the density threshold. Here, it is assumed that the count of the remote assistance request number for one event is "1" at the maximum.

The remote assistance request number calculation unit 47 may count the remote assistance request number at the intersection turn using the request frequency of the remote assistance stored in the remote assistance history database 5. When the dispatched candidate vehicle has the self-determination right turn function, the remote-assistance request number calculation unit 47 may set the count number of the remote-assistance requests at the right turn of the intersection to a larger value as the request frequency of the remote assistance at the time of turning the intersection, which is recorded in association with the intersection to be turned right on the route, is larger.

Alternatively, the remote assistance request number calculating unit 47 may count the number of the remote assistance requests at the time of turning right at the intersection as a larger value than when the request frequency of the remote assistance at the time of turning right at the intersection is less than the right turn request threshold when the request frequency of the remote assistance at the time of turning right at the intersection is equal to or greater than the right turn request threshold.

The remote assistance request number calculation unit 47 may count the remote assistance request number using both the traffic information in the vicinity of the intersection acquired by the traffic information acquisition unit 44 and the request frequency of the remote assistance stored in the remote assistance history database 5.

The remote assistance request number calculation unit 47 may calculate the count number of the remote assistance requests at the right turn of the intersection by increasing or decreasing the count number of the remote assistance requests at the right turn of the intersection, which is obtained from the remote assistance request frequency, in consideration of the influence of the traffic information (vehicle density, etc.). Alternatively, when the request frequency of the remote assistance is recorded in the remote assistance history database 5 in association with the traffic information, the remote assistance request number calculation unit 47 can calculate the count number of the remote assistance request number from the request frequency of the remote assistance at the right turn of the intersection more accurately extracted based on the traffic information by referring to the traffic information in the vicinity of the current intersection.

The remote assistance request number calculation unit 47 may count the remote assistance request number in the section of the lane using the request frequency of the remote assistance stored in the remote assistance history database 5. The remote-assistance request number calculation unit 47 may count the remote assistance request number in a section included in the route as a larger value as the request frequency of the remote assistance in the section is higher. Alternatively, when the request frequency of the remote assistance in the section of the lane included in the route is equal to or greater than the section request threshold, the remote assistance request number calculation unit 47 may count the remote assistance request number in the section as a larger value than when the request frequency of the remote assistance in the section of the lane is less than the section request threshold.

The remote assistance request number calculation unit 47 may count the remote assistance request number by referring to the map information. The remote assistance request number calculation unit 47 may count one remote assistance request number when, for example, there is a traffic signal passing on the route (straight ahead or left at an intersection). The remote assistance request number calculation unit 47 may count one remote assistance request number when there is a railroad crossing on the route. The remote assistance request number calculation unit 47 may count one remote assistance request number when there is a construction section on the route. How to count the remote assistance request number can be arbitrarily set as a remote assistance request condition.

The dispatch route determination unit 48 determines the dispatch route for the point of dispatch P. When there is only one route searched for by the route search unit 45 for the dispatched candidate vehicle, the vehicle dispatch route determination unit 48 determines the route as the vehicle dispatch route for the dispatched candidate vehicle. The vehicle dispatch route determination unit 48 transmits a vehicle dispatch instruction including the vehicle dispatch route to the dispatched candidate vehicle.

The vehicle dispatch route determination unit 48 may determine the dispatch route of the dispatched candidate vehicle based on the required time of each route and the remote assistance request number of each route when a plurality of routes of one dispatched candidate vehicle has been searched for by the route search unit 45.

The vehicle dispatch route determination unit 48 narrows down, for example, only routes whose required time is less than the first time-threshold and whose remote assistance request number is less than the first request-threshold. The vehicle dispatch route determination unit 48 determines, as a vehicle dispatch route, a route having the smallest remote assistance request number among the remaining routes. For example, in the situation illustrated in FIG. 6, when the required time for both the route RA1 and the route RA2 is less than the first time-threshold, the vehicle dispatch route determination unit 48 determines the route RA2, which is not the route RA1 having the remote assistance request number of "1" but has the remote assistance request number of "0" even if it is a little detour, as the vehicle dispatch route. When there are a plurality of routes having the smallest remote assistance request number, the vehicle dispatch route determination unit 48 determines the route having the smallest required time as the vehicle dispatch route.

When no route remains in the route narrowing, the vehicle dispatch route determination unit 48 may relax the threshold condition. The vehicle dispatch route determination unit 48 changes, for example, the first time-threshold for the required time or the first request-threshold for the remote assistance request number to a large value. Alternatively, the vehicle dispatch route determination unit 48 may eliminate the requirement of the threshold value of the required time or the remote assistance request number. The vehicle dispatch route determination unit 48 repeats the relaxation of the threshold condition until the route remains. Thereafter, the vehicle dispatch route determination unit 48 determines the route having the smallest remote assistance request number as the vehicle dispatch route among the remaining routes. The route determination unit 48 does not necessarily perform route narrowing.

It is not always necessary to use the route with the smallest remote assistance request number as the dispatch route. The vehicle dispatch route determination unit 48 may determine a route having the least required time as a vehicle dispatch route. In this case, for example, in the situation illustrated in FIG. 6, the vehicle dispatch route determination unit 48 determines the route RA2, which requires a shorter time than the route RA1, as the vehicle dispatch route. When there are a plurality of routes having the least required time, the vehicle dispatch route determination unit 48 determines the route having the least remote assistance request number as the vehicle dispatch route.

The vehicle dispatch route determination unit 48 may change the method of determining the vehicle dispatch route according to the type of the vehicle dispatch request. For example, when the vehicle dispatch request is a ride request for a user to ride, the vehicle dispatch route determination unit 48 may determine the route having the least required time as the vehicle dispatch route with priority given to the small required time. When the vehicle dispatch request is a pickup request for the user's baggage delivery request, the vehicle dispatch route determination unit 48 may determine the route having the smallest remote assistance request number as the vehicle dispatch route, giving priority to the small remote assistance request number. When the vehicle dispatch request is a time specification, the vehicle dispatch route determination unit 48 may determine the route having the smallest remote assistance request number as the vehicle dispatch route regardless of the type of the vehicle dispatch request.

The dispatch route determination unit 48 may postpone the determination of the dispatch route from the plurality of routes to the route branch point. For example, in the case where the section where the dispatched candidate vehicle reaches the route branch point is common to all the routes, the vehicle dispatch route determination unit 48 postpones the determination of the vehicle dispatch route until the dispatched candidate vehicle reaches the route branch point. A route branch point is a point (for example, an intersection) at which a plurality of routes branch.

The vehicle dispatch route determination unit 48 determines whether or not the dispatched candidate vehicle has reached the route branch point based on the map information and the position information of the dispatched candidate vehicle. Reaching the route branch point may mean that the dispatched candidate vehicle enters the intersection which is the route branch point, or that the dispatched candidate vehicle reaches a point a certain distance before the route branch point. The certain distance is not particularly limited. The certain distance may be 1 m or 3 m. The point before a certain distance may be the position of temporary stop line at the entrance of the intersection.

Figure 9A:
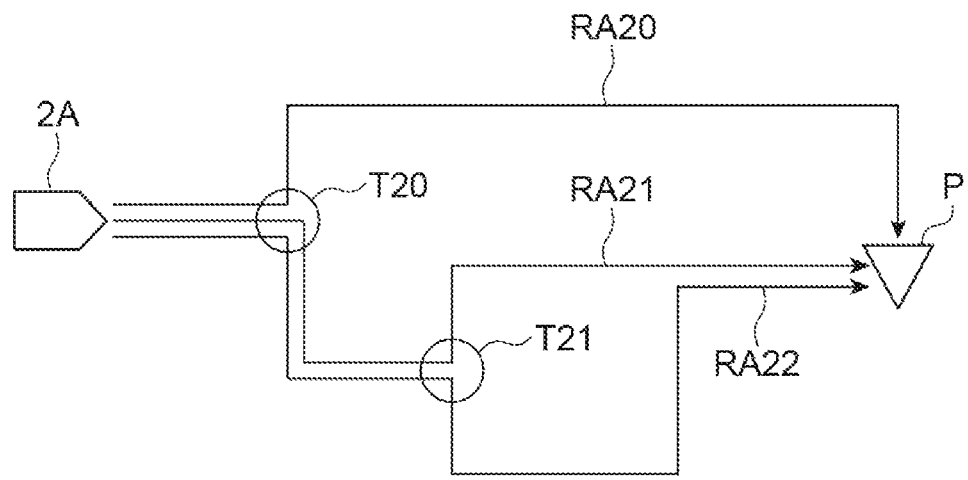
FIG. 9A is a diagram illustrating for explaining the postponement of determination of vehicle dispatch route to the route branch point.

FIG. 9A is a diagram illustrating for explaining the postponement of determination of vehicle dispatch route to the route branch point. FIG. 9A shows the dispatched candidate vehicle 2A, route RA20, route RA21, route RA22, route branch point T20, route branch point T21, and the point of dispatch P. The route branch point T20 and the route branch point T21 are, for example, T-junctions. At the route branch point T20, the route RA20 branches to the right, and the routes RA21 and RA22 branch to the left. At the route branch point T21, the route RA21 branches to the right and the route RA22 branches to the left.

In the situation illustrated in FIG. 9A, the dispatch route determination unit 48 may postpone the determination of the dispatch route until the dispatched candidate vehicle 2A reaches the route branch point T20. For example, when the dispatched candidate vehicle 2A reaches the route branch point T20, the traffic information in the vicinity of the route branch point T20 can be acquired from the dispatched candidate vehicle 2A, and the prediction accuracy of the required time by the required time prediction unit 46 can be improved using the traffic information. The vehicle dispatch route determination unit 48 determines the vehicle dispatch route using the required time newly predicted for each route (route RA20, route RA21, and route RA22). It is to be noted that the acquisition of the traffic information from the dispatched candidate vehicle 2A is not necessarily required, and the accuracy of the prediction of the required time by the required time prediction unit 46 can be improved by using the latest traffic information obtained by the elapse of time. Further, since the remaining length of each route up to the point of dispatch P is shortened by the amount of travel of dispatched candidate vehicle, it is possible to improve the prediction accuracy of the required time as compared with the case of not postponing.

If the route RA20 is not determined to be the dispatch route even when the dispatched candidate vehicle 2A reaches the route branch point T20 (if the route RA21 or the route RA22 is a candidate for the dispatch route), the dispatch route determination unit 48 may postpone the determination of the dispatch route until the dispatched candidate vehicle 2A reaches the next route branch point T21. The vehicle dispatch route determination unit 48 may determine the vehicle dispatch route from the routes RA21 and RA22 by using the required time newly predicted when the dispatched candidate vehicle 2A reaches the next route branch point T21.

The vehicle dispatch route determination unit 48 may narrow down to only those routes in which the required time is less than the second time-threshold and the remote assistance request number is less than the second request-threshold among all the routes of the plurality of dispatched candidate vehicles. The second time-threshold value may be a threshold value equal to or different from the first time-threshold value of only one dispatched candidate vehicle. The second request-threshold value may be a threshold value equal to or different from the first request-threshold value of only one dispatched candidate vehicle. When there is no route left in the route narrowing, the vehicle dispatch route determination unit 48 may relax the threshold condition as in the case where there is only one dispatched candidate vehicle.

The vehicle dispatch route determination unit 48 may change the values of the second time-threshold and/or the second request-threshold for each dispatched candidate vehicles. The vehicle dispatch route determination unit 48 may set the second time threshold value to a larger value as the distance from the point of dispatch P is greater at the dispatched candidate vehicle. As a result, it is possible to find the dispatched candidate vehicles that has a route with a small remote assistance request number even if it is far from the point of dispatch P. The route determination unit 48 does not necessarily perform route narrowing.

The vehicle dispatch route determination unit 48 may change the value of the second request-threshold value based on the number of working people of the remote operator R (the remote assistance request number that can be handled). When the number of workers of the remote operator R is sufficiently large, the required time can be given priority without imposing a load on the remote operator R. The vehicle dispatch route determination unit 48 may set the second request-threshold value to a larger value as the number of workers of the remote operator R increases. The vehicle dispatch route determination unit 48 may change the second request-threshold value according to the change in the number of working people of the remote operator R (the change in the remote assistance request number that can be handled over time).

The vehicle dispatch route determination unit 48 may predict the process start time and the process time of the remote operator R for each remote assistance request in the route. The response start time of the remote operator R for each remote assistance request is a time at which the remote operator R receives the remote assistance request and starts the response. The response time is a time considered to be necessary for the remote operator R to grasp the situation of the dispatched candidate vehicle and perform remote assistance.

The vehicle dispatch route determination unit 48 predicts the process start time of the remote operator R of the remote assistance request for turning right at the intersection based on the current vehicle speed of dispatched candidate vehicle and the distance to the intersection to be turned right on the route, for example. Based on the course (route and vehicle speed plan) obtained from the dispatched candidate vehicle, the vehicle dispatch route determination unit 48 may predict the time at which the remote operator R in the remote assistance request for turning right at the intersection starts to respond by predicting the time at which the dispatched candidate vehicle reaches the vicinity of the intersection to be turned right.

The vehicle dispatch route determination unit 48 refers to a database of processing times determined in advance according to the content of the remote assistance request, for example, and predicts the processing time of the intersection right turn. The vehicle dispatch route determination unit 48 may predict the time processing to the right turn at the intersection from the history of the time required to respond to the past remote assistance requests at the intersection. For example, the method described in Japanese Patent Application No. 2019-146571 can be used to determine the process start time and the process time of the remote operator R for each remote assistance request.

The vehicle dispatch route determination unit 48 may determine the dispatch route based on the predicted process start time and the time change of the remote assistance request number that the remote operator R can deal when predicting the process start time and the process time of the remote operator R for each remote assistance request in the route. The remote assistance request number that can be handled is, for example, the number of employees of the remote operator R. The number of possible remote assistance requests may be a number obtained by subtracting a certain number from the number of working people of the remote operator R. The remote assistance request number that can be handled is not particularly limited as long as it is a number corresponding to the number of workers of the remote operator R.

Even if the route has the same remote assistance request number as the processing time of the remote operator R for each remote assistance request in each route of dispatched candidate vehicle, the burden on the remote operator R is different in the case where the remote assistance requests are distributed in time and the case where the remote assistance requests are concentrated in time. Even if the remote assistance request number is small, the remote operator R may be heavy burdened with a route in which a plurality of remote assistance requests is made at a timing overlapping by a plurality of dispatched candidate vehicles. For this reason, the vehicle dispatch route determination unit 48 may determine the vehicle dispatch route of the dispatched candidate vehicles such that the number of dispatched candidate vehicles, which is the time corresponding to the remote assistance request at a certain time, is equal to or less than a threshold value corresponding to the number of working persons of the remote operator R at that time.

Figure 9B:
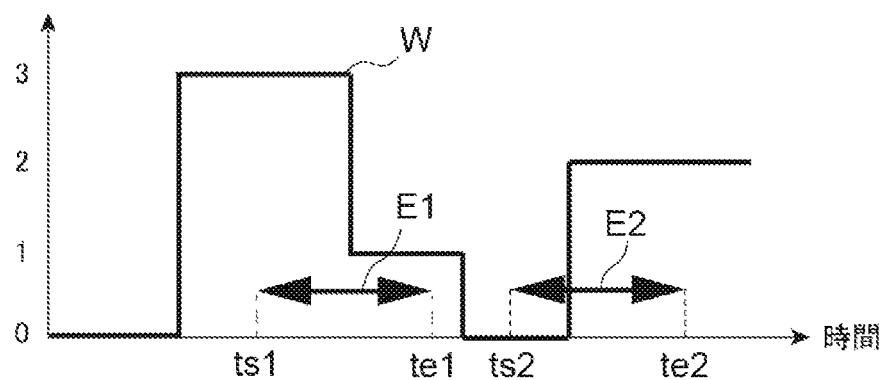
FIG. 9B is a diagram illustrating an example of the remote assistance request number that can be handled, the time at which the remote assistance requests start to be handled, and the processing time.

FIG. 9B is a diagram illustrating an example of the remote assistance request number that can be handled, the time at which the remote assistance requests start to be handled, and the processing time. The vertical axis indicates the remote assistance request number that can be handled, and the horizontal axis indicates the time. FIG. 9B shows the time change of remote assistance request number W, the processing time E1 in the first remote assistance request in the route, and the processing time E2 in the second remote assistance request in the route. Also shown are the process start time ts1 and the process end time te1 in the first remote assistance request, and the process start time ts2 and the process end time te2 in the second remote assistance request.

As illustrated in FIG. 9B, the remote assistance request number that can be handled varies depending on time, for example, according to the number of workers of the remote operator R. In the situation illustrated in FIG. 9B, the vehicle dispatch route determination unit 48 may exclude the route from the candidates of the vehicle dispatch route (narrows down the route), so that the processing time E2 in the second remote assistance request is in the time zone in which the number of possible remote assistance requests is "0". Because the processing time E1 in the first remote assistance request is included in the time zone in which the number of possible remote assistance requests is "1" or more, the remote operator R can handle the processing time E1.

The vehicle dispatch route determination unit 48 determines, for each dispatched candidate vehicles, as the dispatch route, the route having the smallest remote assistance request number among the routes remaining after the above-described narrowing down. The vehicle dispatch route determination unit 48 may determine, for each dispatched candidate vehicles, the route having the shortest required time among the remaining routes as the vehicle dispatch route.

The vehicle dispatch control unit 49 controls the dispatch a plurality of dispatched candidate vehicles for which the dispatch route is determined. The vehicle dispatch control unit 49 transmits a vehicle dispatch instruction including a vehicle dispatch route to the dispatched candidate vehicles, thereby starting the vehicle dispatch to the point of dispatch P by dispatched candidate vehicles and driving the vehicle along the vehicle dispatch route.

The vehicle dispatch control unit 49 may narrow down dispatched candidate vehicles so that the total remote assistance request number in all the dispatched candidate vehicles dispatch routes to point of dispatch P is equal to or less than the total request threshold. The total request threshold may be a fixed value, for example. The total request threshold value may be a threshold value that becomes larger as the length of the dispatch route of the specific dispatched candidate vehicle and the point of dispatch P at the start of the dispatch becomes longer. The specific dispatched candidate vehicle may be, for example, the dispatched candidate vehicle closest to or farthest from the point of dispatch P. The total request threshold may be "0".

When the total remote assistance request number exceeds the total request threshold, the vehicle dispatch control unit 49 may exclude the vehicle having the vehicle dispatch route having the largest remote assistance request number from the dispatched candidate vehicle. Alternatively, the vehicle dispatch control unit 49 may exclude the vehicle farthest from the point of dispatch P or the vehicle having the largest required time to reach the point of dispatch P from the dispatched candidate vehicle. The vehicle dispatch control unit 49 may remove the vehicle from the dispatched candidate vehicle until the total remote assistance request number is equal to or less than the total request threshold.

In the situation illustrated in FIG. 8, the vehicle dispatch control unit 49 narrows down the dispatched candidate vehicles to only the dispatched candidate vehicle 2B of the route having the remote assistance request number of "0" and the dispatched candidate vehicle 2D of the route having the remote assistance request number of "0" when the total request threshold value is "0".

The vehicle dispatch control unit 49 removes either the dispatched candidate vehicle 2A with the route RA1 or the dispatched candidate vehicle 2C with the route RC1 from the dispatched candidate vehicles, when the total request threshold is 1. The vehicle dispatch control unit 49 may remove the dispatched candidate vehicle 2C which is either longer or longer based on the length of the route or the time required.

Alternatively, vehicle dispatch control unit 49 may limit the dispatched candidate vehicle to minimize the burden on the remote operator R based on the response start time and response time of the remote operator R for each remote assistance request on the above-described route and the time change of the remote assistance request number that the remote operator R can respond. When the difference in speed between the dispatched candidate vehicle 2A and the dispatched candidate vehicle 2C is large and the remote assistance request number that can be handled by the remote operator R is larger at the time of starting the right turn at the intersection on the route RC2 than at the time of starting the right turn at the intersection on the route RA1, the vehicle dispatch control unit 49 may remove the dispatched candidate vehicle 2A and leave the dispatched candidate vehicle 2C. The vehicle dispatch control unit 49 leaves all of the dispatched candidate vehicles 2A-2D illustrated in FIG. 8 when the total request threshold value is two or more. The vehicle dispatch control unit 49 sends a dispatch instruction including a dispatch route to the dispatched candidate vehicles after it is narrowed down.

The vehicle dispatch control unit 49 may issue a pickup display instruction to make the dispatched candidate vehicle display a pickup vehicle. The vehicle dispatch control unit 49 may include an instruction for pickup display in the dispatch instruction. The vehicle dispatch control unit 49 may cause any one of a plurality of the dispatched candidate vehicles traveling toward one point of dispatch P to indicate pickup display and may not cause the remaining dispatched candidate vehicles to indicate pickup display. The vehicle dispatch control unit 49 may cause only the dispatched candidate vehicle, which has the shortest required time for the vehicle dispatch route at the time of the start of the vehicle dispatch, to indicate pickup display.

Figure 10A:
FIG. 10A is a diagram illustrating an example of a pickup display for outside the vehicle at the dispatched candidate vehicle.

FIG. 10A is a diagram illustrating an example of a pickup display for outside the vehicle at the dispatched candidate vehicle. The pickup display as illustrated in FIG. 10A is displayed on an exterior display 27 of the vehicle. The pickup display may be projected on a window of the vehicle.

The vehicle dispatch control unit 49 may perform a vehicle narrowing process for a plurality of dispatched candidate vehicles being dispatched to the point of dispatch P. The vehicle dispatch control unit 49 determines whether or not the predetermined vehicle narrowing down condition is satisfied based on the distance between the dispatched candidate vehicles and the point of dispatch P or the required time of the two dispatched candidate vehicles traveling toward the point of dispatch P. The vehicle narrowing down condition is a condition for narrowing down the number of dispatched candidate vehicles.

The vehicle dispatch control unit 49 may determine that the vehicle narrowing down condition is satisfied when the distance between any one of the dispatched candidate vehicles traveling toward point of dispatch P and point of dispatch P is less than the narrowing down distance threshold value. The narrowing down distance threshold is not particularly limited. The narrowing down distance threshold value may be a fixed value, or may be a value determined by multiplying the length of the vehicle dispatch route between the specific dispatched candidate vehicle (for example, the dispatched candidate vehicle closest to the point of dispatch P or the dispatched candidate vehicle farthest from the point of dispatch P) and the point of dispatch P at the start of vehicle dispatch by a predetermined ratio.

The vehicle dispatch control unit 49 may determine that the vehicle narrowing down condition has been satisfied when the total length of the distance traveled relative to the total length of the vehicle routing routes of all the dispatched candidate vehicles in the vehicle dispatch toward point of dispatch P reaches a certain ratio. The certain ratio is not particularly limited. The certain ratio may be 70%, 50%, or 30%.

The vehicle dispatch control unit 49 may determine that the vehicle narrowing down condition is satisfied when the time required for any one of the 9 dispatched candidate vehicles traveling toward point of dispatch P to reach point of dispatch P is less than the narrowing down time threshold. The narrowing time threshold is not particularly limited. The narrowing time threshold value may be a fixed value, or may be a value determined by multiplying the required time of a specific dispatched candidate vehicle (for example, dispatched candidate vehicle having the shortest required time or dispatched candidate vehicle having the longest required time) at the start of vehicle dispatching by a predetermined ratio.

The vehicle dispatch control unit 49 may determine that the vehicle narrowing down condition is satisfied when the elapsed time of all the dispatched candidate vehicles in the dispatch to the point of dispatch P becomes a certain percentage of the total required time. The specific ratio is not particularly limited. The constant ratio may be 70%, 50%, or 30%.

The vehicle dispatch control unit 49 stops dispatching at least one dispatched candidate vehicles to the point of dispatch P when it is determined that the vehicle narrowing down condition is satisfied. The vehicle (autonomous driving vehicle 2) may stop from being dispatched continues running in a predetermined passenger search mode. When the vehicle dispatch is stopped, the vehicle may run toward a predetermined waiting point or the nearest oil supply point (power supply point).

The vehicle dispatch control unit 49 stops, for example, the dispatching of dispatched candidate vehicle, which is farthest from point of dispatch P, to point of dispatch P among the dispatched candidate vehicles traveling toward point of dispatch P. The vehicle dispatch control unit 49 may stop dispatching the dispatched candidate vehicle to the point of dispatch P, which takes the longest time to reach the point of dispatch P among dispatched candidate vehicles traveling toward point of dispatch P. The vehicle dispatch control unit 49 may stop dispatching the dispatched candidate vehicle to the point of dispatch P, which has the largest remote assistance request number among dispatched candidate vehicles traveling to the point of dispatch P. The pickup display is terminated if the pickup display is being displayed when the dispatch of the vehicle is stopped.

The vehicle dispatch control unit 49 may have two or more dispatched candidate vehicles to stop dispatching. The vehicle dispatch control unit 49 may stop the dispatch of the remaining dispatched candidate vehicles, except for a certain number of dispatched candidate vehicles in the order of proximity to the point of dispatch P or the order of the required time. The vehicle dispatch control unit 49 may perform the vehicle narrowing down process in a plurality of stages, and the number of vehicles traveling toward the point of dispatch P may be reduced as the dispatched candidate vehicles approaches the point of dispatch P. The vehicle dispatch control unit 49 may have only one dispatched candidate vehicle that eventually leads to point of dispatch P. The first dispatched candidate vehicle to arrive at point of dispatch P will be the dispatch vehicle for the user.

Figure 11B:
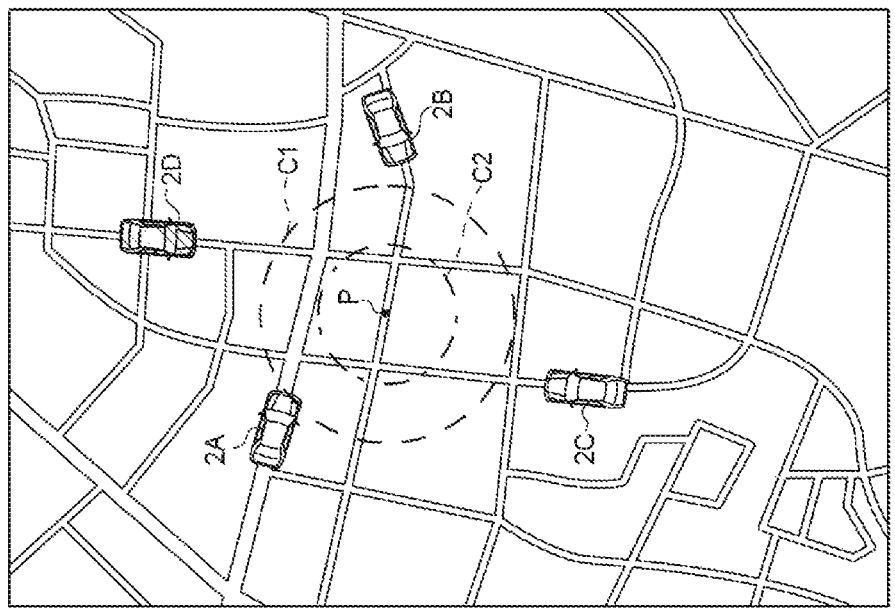
FIG. 11B is a diagram illustrating an example of a situation where the vehicle narrowing down condition is satisfied.
Figure 11A:
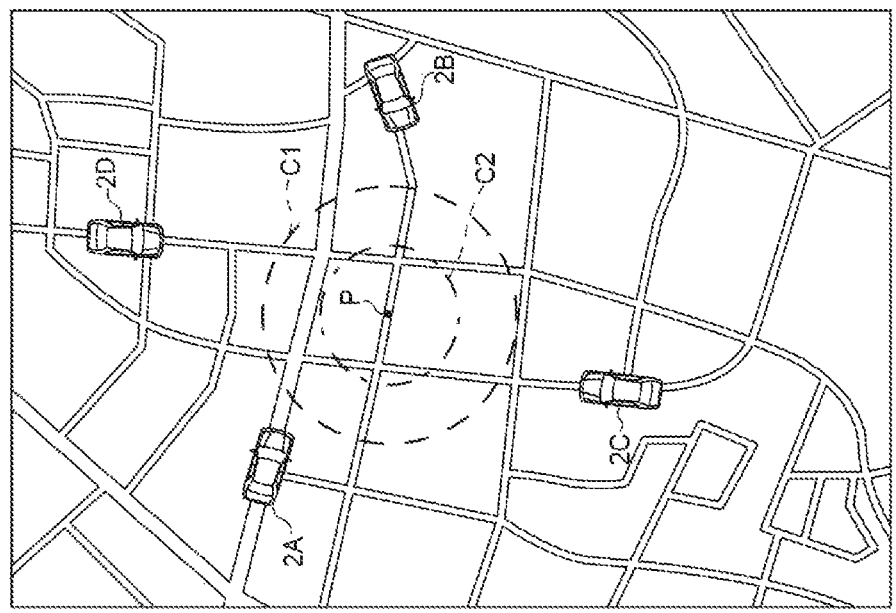
FIG. 11A is a diagram illustrating an example of a vehicle narrowing down condition.

FIG. 11A is a diagram illustrating for explaining an example of a vehicle narrowing down condition. FIG. 11A shows the dispatched candidate vehicle 2A to 2d running toward the point of dispatch P. Further, a virtual circle C1 and a virtual circle C2 around the point of dispatch P are shown. The virtual circle C1 is a circle on the map corresponding to the first narrowing distance threshold value. The virtual circle C2 is a circle on the map corresponding to a second narrowing distance threshold having a value smaller than the first narrowing distance threshold. In the situation illustrated in FIG. 11A, none of dispatched candidate vehicle 2A to 2d reaches the virtual circle C1.

FIG. 11B is a diagram illustrating for explaining an example of a situation where the vehicle narrowing down condition is satisfied. In FIG. 11B, the dispatched candidate vehicle 2A reaches the virtual circle C1. In the situation illustrated in FIG. 11B, the vehicle dispatch control unit 49 determines that the vehicle narrowing down condition is satisfied when the distance between the dispatched candidate vehicle 2A and the point of dispatch P becomes equal to or less than the first narrowing distance threshold value. The vehicle dispatch control unit 49 will stop dispatching at least the dispatched candidate vehicle 2D farthest from the point of dispatch P.

The vehicle dispatch control unit 49 stops the dispatch of the remaining dispatched candidate vehicle 2B, 2C when the dispatched candidate vehicle 2A reaches the virtual circle C2 and the distance between the dispatched candidate vehicle 2A and the point of dispatch P becomes equal to or less than the narrowing distance threshold value, thereby determining that the vehicle narrowing down condition is satisfied.

The user display control unit 50 transmits the vehicle dispatch related information to the user terminal 60. The user display control unit 50 may transmit the latest vehicle dispatch related information when an application relating to the vehicle dispatch of the vehicle dispatch system 1 installed in the user terminal 60 is opened. The vehicle dispatch related information includes the position information of the autonomous driving vehicle 2 or dispatched candidate vehicle during the vehicle dispatch. The position information of dispatched candidate vehicle is displayed on the application screen of the user terminal 60 when the vehicle is being dispatched. The time required for a plurality of the dispatched candidate vehicles to arrive at point of dispatch P may be displayed.

The user display control unit 50 may display the state of the autonomous driving vehicle 2 including dispatched candidate vehicle to the user terminal 60 (the user terminal 60 in which the application relating to the dispatch of the vehicle dispatch system 1 is opened) of the user who is not in the dispatch state.

Figure 10B:
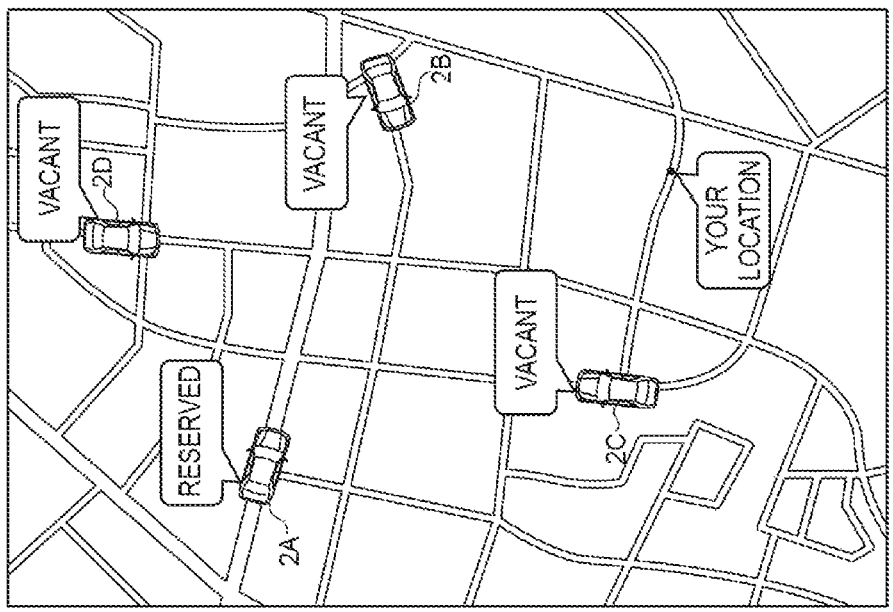
FIG. 10B is a diagram illustrating an example of a display screen of vehicle dispatch related information in the user terminal.

FIG. 10B is a diagram illustrating an example of a display screen of vehicle dispatch related information in the user terminal 60. FIG. 10B shows an example of a display screen of vehicle dispatch related information on the user terminal 60 of a user who is considering whether to issue a vehicle dispatch request (a user who is not in vehicle dispatch). The dispatched candidate vehicles 2A to 2D illustrated in FIG. 10B are vehicles already running in response to a vehicle dispatch request made by another user. The user display control unit 50 displays that only one of the dispatched candidate vehicles 2A to 2D is being picked up (not being able to be additional picked up), and displays that the remaining dispatched candidate vehicles 2B to 2D can be picked up.

The dispatched candidate vehicle 2A displayed on the user terminal 60 as being in the vehicle pickup state may be a vehicle in which the vehicle pickup display is displayed outside the vehicle by the vehicle dispatch control unit 49. The indication that the vehicle cannot be dispatched is not limited to the indication that the vehicle is being picked up illustrated in FIG. 10B. It is sufficient that the display is such that the user can recognize that the vehicle cannot be dispatched. The same applies to the indication that the vehicle can be dispatched.

Vehicle Dispatch Method of Vehicle Dispatch System

The vehicle dispatch method of vehicle dispatch system 1 (vehicle dispatch server 10) according to the first embodiment will be described. FIG. 12 is a flowchart illustrating an example of the vehicle dispatch start process. The vehicle dispatch start processing is executed, for example, when a vehicle dispatch request is received by the vehicle dispatch request receiving unit 42. The vehicle dispatch start processing may be started when a vehicle dispatch request with a specified time is received, and when a predetermined time elapses from the specified time. In the present embodiment, the vehicle dispatch start process when a plurality of the dispatched candidate vehicles is selected is handled.

As illustrated in FIG. 12, the vehicle dispatch server 10 of vehicle dispatch system 1 sets the point of dispatch P by the vehicle dispatch request receiving unit 42 in S10 (point of dispatch setting step). The vehicle dispatch request receiving unit 42 may set a point closest to the position of user terminal 60 as point of dispatch P from among a plurality of possible boarding points set in advance on the map based on the position information of the user terminal 60.

In S12, the vehicle dispatch server 10 selects dispatched candidate vehicles by the dispatched candidate vehicle selection unit 43 (dispatched candidate vehicle selection step). The dispatched candidate vehicle selection unit 43 selects dispatched candidate vehicles based on the location of the point of dispatch P and the autonomous driving vehicles 2. The dispatched candidate vehicle selection unit 43 selects, for example, the autonomous driving vehicles 2 located within a certain distance from the point of dispatch P as the dispatched candidate vehicles. The dispatched candidate vehicle selection unit 43 selects a plurality of dispatched candidate vehicles.

In S14, the vehicle dispatch server 10 searches for a route for the dispatched candidate vehicle to reach the point of dispatch P by the route search unit 45 (route search step). The route search unit 45 performs a route search based on, for example, the position information of the point of dispatch P and the dispatched candidate vehicle and the map information of the map database 4.

In S16, the vehicle dispatch server 10 determines whether or not two dispatched candidate vehicles satisfying the duplication condition in which the respective routes are set in advance by the route search unit 45 exist (duplication condition determination step). The route search unit 45 makes the above determination based on the searched route for each dispatched candidate vehicle. If the vehicle dispatch server 10 determined that there are two dispatched candidate vehicles whose routes satisfy the duplication condition set in advance (YES in S16), the process proceeds to S18. If the vehicle dispatch server 10 is not determined that there are two dispatched candidate vehicles whose routes satisfy the duplication condition set in advance (NO in S16), the process proceeds to S20.

In S18, the vehicle dispatch server 10 excludes at least one route from the route search result so that the duplicate condition is not satisfied by the route search unit 45 (duplicate route exclusion step). The route search unit 45 may preferentially exclude the longer of two routes satisfying the duplication condition.

In S20, the vehicle dispatch server 10 predicts the required time of each route by the required time prediction unit 46 (required time prediction step). The required time prediction unit 46 predicts the required time, for example, based on the course (route and vehicle speed plan) of the autonomous driving for each route.

In S22, the vehicle dispatch server 10 calculates the remote assistance request number for each route by the remote assistance request number calculation unit 47 (remote assistance request number calculation step). The remote assistance request number calculation unit 47 calculates the remote assistance request number based at least on the route and the remote assistance request condition. The processing order in S20 and the processing in S22 may be reversed or may be performed simultaneously. When the remote assistance request number has been calculated, the required time prediction unit 46 may predict the required time based on the remote assistance request number.

In S24, the vehicle dispatch server 10 determines the dispatch route for the point of dispatch P by the dispatch route determination unit 48 (dispatch route determination step). For example, the vehicle dispatch route determination unit 48 narrows down only route whose required time is less than the first time-threshold and whose remote assistance request number is less than the first request threshold. The vehicle dispatch route determination unit 48 determines, as a vehicle dispatch route, a route having the smallest remote assistance request number among the remaining routes. The vehicle dispatch route determination unit 48 may determine the vehicle dispatch routes of a plurality of the dispatched candidate vehicles so that the total remote assistance request number is equal to or less than the total request threshold. The vehicle dispatch route determination unit 48 may predict the process start time and the process time of the remote operator R for each remote assistance request in the route, and determine the vehicle dispatch route using the predicted process start time and the process time of the remote operator R and the remote assistance request number that the remote operator R can handle.

In S26, the vehicle dispatch server 10 instructs the dispatched candidate vehicles to dispatch the vehicle by the vehicle dispatch control unit 49 (dispatch control step). The vehicle dispatch control unit 49 transmits a vehicle dispatch instruction including a vehicle dispatch route to the dispatched candidate vehicles, thereby starting the vehicle dispatch to the point of dispatch P by the dispatched candidate vehicles and driving the vehicle along the vehicle dispatch route. Further, the vehicle dispatch control unit 49 may indicate the pickup display to be included in the dispatch instruction so that any one of the dispatched candidate vehicles traveling toward the point of dispatch P indicate the pickup display to the outside of the vehicle. The vehicle dispatch control unit 49 may not require the remaining dispatched candidate vehicles to indicate pickup display.

In S28, the vehicle dispatch server 10 displays the state of the autonomous driving vehicle 2 including the dispatched candidate vehicles by the user display control unit 50 to the user terminal 60 of the user who is not in the vehicle dispatch (user terminal display step). The user terminal 60 in which the application relating to the vehicle dispatch of vehicle dispatch system 1 has been opening. The user display control unit 50 may display that only one of the dispatched candidate vehicles 2A-2D is being picked up (not being able to be picked up, reserved) while others are being taken in (being able to be picked up, vacant). After that, the vehicle dispatch server 10 ends the present dispatch start processing.

Figure 13:
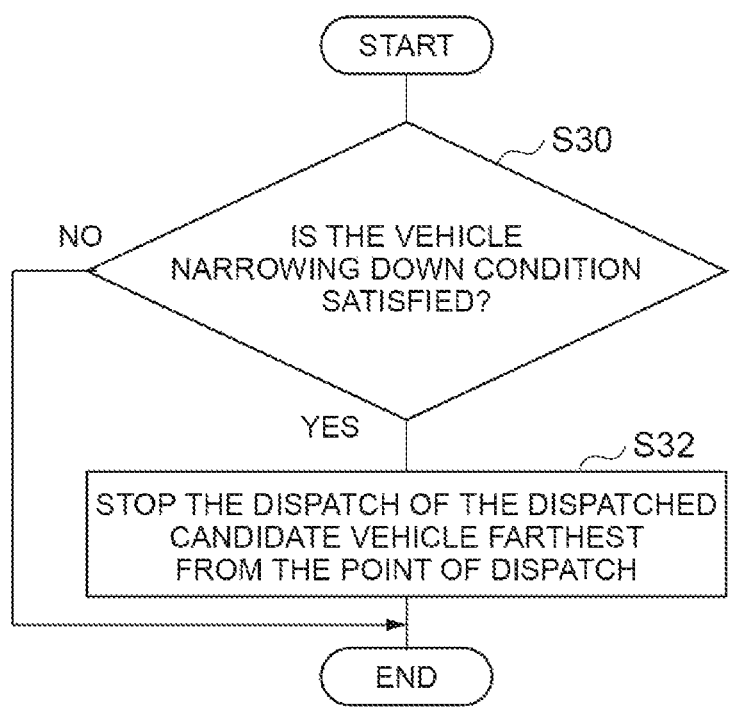
FIG. 13 is a flowchart illustrating an example of the vehicle narrowing down process.

FIG. 13 is a flowchart illustrating an example of the vehicle narrowing down process. The vehicle narrowing down process illustrated in FIG. 13 is executed while a plurality of dispatched candidate vehicles is dispatched to the point of dispatch P.

As illustrated in FIG. 13, the vehicle dispatch server 10 determines whether or not the vehicle narrowing down condition is satisfied by the vehicle dispatch control unit 49 as S30 (vehicle narrowing down condition determination step). The vehicle dispatch control unit 49 may determine that the vehicle narrowing down condition is satisfied when the distance between dispatched candidate vehicles and the point of dispatch P of any one of a plurality of dispatched candidate vehicles traveling toward the point of dispatch P is less than the narrowing down distance threshold value. The vehicle dispatch control unit 49 may determine that the vehicle narrowing down condition is satisfied when the time required for any one of the dispatched candidate vehicles traveling toward the point of dispatch P to reach the point of dispatch P is less than the narrowing down time threshold.

If it is determined that the vehicle narrowing down condition is satisfied (YES in S30), the process proceeds to S32. If it is determined that the vehicle narrowing down condition is not satisfied (NO in S30), the vehicle dispatch server 10 ends the present process. The vehicle dispatch server 10 makes the determination of S30 again after a certain period of time has elapsed.

In S32, the vehicle dispatch server 10 stops the dispatch of at least one dispatched candidate vehicles to the point of dispatch P by the vehicle dispatch control unit 49 (dispatch stop step). The vehicle dispatch control unit 49 stops the dispatching of dispatched candidate vehicle farthest from the point of dispatch P to the point of dispatch P among dispatched candidate vehicles traveling toward the point of dispatch P. The vehicle dispatch control unit 49 may stop dispatching the dispatched candidate vehicle to the point of dispatch P, which takes the longest time to reach the point of dispatch P among dispatched candidate vehicles traveling toward the point of dispatch P. Then, the vehicle dispatch server 10 terminates the present vehicle narrowing down process.

In the vehicle dispatch system 1 (vehicle dispatch server 10) according to the present embodiment described above, by dispatching a plurality of vehicles to the point of dispatch where the user is present, it is possible to realize a vehicle dispatch with a high degree of certainty for the user, and it is possible to improve the chance of attracting customers of the potential user as compared with the case where only one vehicle is dispatched and the remaining vehicle is driven without any purpose.

According to the vehicle dispatch system 1, if there are two dispatched candidate vehicles whose routes satisfy the duplication condition set in advance, and a problem occurs that prevents the two dispatched candidate vehicles from traveling on the route that satisfies the duplication condition, all of them will be affected. Therefore, by excluding at least one route so that the duplication condition is not satisfied, the certainty of the dispatch of the vehicle to the user can be enhanced.

According to the vehicle dispatch system 1, by having any one of at least two or more dispatched candidate vehicles running toward the point of dispatch P indicate the pickup display to the outside, it is possible to respond to the request for the pickup by the other user by not having the remaining dispatched candidate vehicles indicate the pickup display while securing the dispatch of the vehicle to the user, thereby improving the opportunity for the potential user to attract customers.

According to the vehicle dispatch system 1, at least one of the two or more dispatched candidate vehicles traveling toward the point of dispatch P is made to indicate on the user terminal that it cannot be dispatched so that the remaining dispatched candidate vehicles are made to indicate that they can be dispatched, so that it is possible to respond to a request for vehicle dispatch by another user, and it is possible to improve an opportunity for attracting a potential user.

According to the vehicle dispatch system 1, when it is determined that the vehicle narrowing down condition is satisfied based on the distance between the plurality of the dispatched candidate vehicles traveling toward the point of dispatch P and the point of dispatch P or the time required by the plurality of the dispatched candidate vehicles traveling toward the point of dispatch P, the dispatching of at least one candidate vehicle to the point of dispatch P is stopped. Therefore, the vehicle dispatch efficiency can be improved compared to the case where a plurality of the dispatched candidate vehicles gathers at the point of dispatch P as it is and interfere with the driving of other dispatched candidate vehicles.

According to the vehicle dispatch system 1, a plurality of dispatched candidate vehicles are remote assistance vehicles for carrying out autonomous driving by receiving remote assistance from a remote operator, and since the plurality of the dispatched candidate vehicles are narrowed down so that the total remote assistance request number is equal to or less than the total request, the vehicle can be dispatched in consideration of the burden on the remote operator.

The embodiment of the present disclosure is described above, but the present disclosure is not limited to the above-described embodiment. The present disclosure can be implemented in various forms including various modifications and improvements based on the knowledge of those skilled in the art including the above-described embodiment.

The part of the function of the vehicle dispatch server 10 in the vehicle dispatch system 1 may be provided on the dispatched candidate vehicle side. For example, the dispatched candidate vehicle selection unit 43 may be implemented by the autonomous driving ECU 20 of the autonomous driving vehicle 2. When the autonomous driving ECU 20 receives, for example, point of dispatch P, it may use its own position information to determine whether it corresponds to the dispatched candidate vehicle.

At least one of the traffic information acquisition unit 44, the route search unit 45, the required time prediction unit 46, the remote assistance request number calculation unit 47, and the vehicle dispatch route determination unit 48 may be realized by the autonomous driving ECU 20. Thereby reducing the amount of calculation at the vehicle dispatch server 10.

The vehicle dispatch server 10 does not necessarily have the traffic information acquisition unit 44. The required time prediction unit 46 may predict the required time without referring to the traffic information.

The vehicle dispatch server 10 is not necessarily connected to the remote assistance history database 5. The remote assistance request number calculation unit 47 may calculate the remote assistance request number without referring to the remote assistance request frequency. The remote assistance request number is not necessarily a number and may be used as a stepwise index.

In the flow chart illustrated in FIG. 12, when it is determined that the required time of the route is equal to or greater than the first time-threshold as a result of predicting the required time by S24, the remote assistance request number for the route need not be calculated. Similarly, when the remote assistance request number is calculated, and it is determined that the remote assistance request number is equal to or greater than the first request-threshold value, the time required for the route need not be predicted.

The autonomous driving vehicles 2, which is the target of the dispatch of the vehicle dispatch system 1, does not necessarily have to be a remote assistance vehicle. The autonomous driving vehicles 2 does not have to be capable of receiving remote assistance from the remote operator R. In this case, the vehicle dispatch server 10 is not required to have the function of a remote assistance server, and the remote operator R is not required. The autonomous driving vehicles 2 does not need to have a remote assistance request determination unit 36. The vehicle dispatch server 10 does not need to have a remote assistance request number calculation unit 47, and does not need to use the remote assistance request number for various processes. In this case, the step of calculating the remote assistance request number in S22 of FIG. 12 is also unnecessary.

The route search unit 45 does not necessarily need to determine the duplication condition. The determination of the duplication condition and the exclusion of the route may be performed by the vehicle dispatch route determination unit 48. In this case, the route satisfying the duplication condition is excluded from the target of the dispatch route.

The vehicle dispatch control unit 49 may cause a plurality of the dispatched candidate vehicles to indicate the pickup display instead of one dispatched candidate vehicle. The vehicle dispatch control unit 49 may cause all vehicles to indicate the pickup display or may not cause all vehicles to display the pickup indication.

The user display control unit 50 does not necessarily need to display that the vehicle cannot be dispatched to only one of the dispatched candidate vehicles already running in response to a vehicle dispatch request made by another user, and may display that the vehicle cannot be dispatched to a plurality of the dispatched candidate vehicle. The user display control unit 50 may display that all the dispatched candidate vehicle cars are not available for dispatch or may display that all the dispatched candidate vehicle cars are available for dispatch. The user display control unit 50 may not have to cause the user terminal 60 of another user who has not issued the vehicle dispatch request to display the information on the dispatched candidate vehicle during the vehicle dispatch in response to the other vehicle dispatch request.

What is claimed is:

1. A vehicle dispatch system for dispatching a plurality of autonomous driving vehicles to a predetermined point of dispatch, the vehicle dispatch system comprising:
    a server including a processor configured to:
    select a plurality of dispatched candidate vehicles for the point of dispatch from the autonomous driving vehicles based on the point of dispatch and positions of the autonomous driving vehicles;
    search routes to the point of dispatch for the dispatched candidate vehicles based on the point of dispatch, the positions of the dispatched candidate vehicles and map information;
    dispatch at least two or more of the dispatched candidate vehicles to the point of dispatch, when the dispatched candidate vehicles are selected,
    after the dispatched candidate vehicles are dispatched so as to travel toward the point of dispatch, determine whether or not a preset vehicle narrowing down condition is satisfied based on a distance between the point of dispatch and the dispatched candidate vehicles traveling toward the point of dispatch or a required time of the dispatched candidate vehicles arrival to the point of dispatch,
    wherein the vehicle narrowing down condition is satisfied when the distance between any one of the dispatched candidate vehicles traveling toward the point of dispatch and the point of dispatch is less than a narrowing down distance threshold value, or when the time required for any one of the dispatched candidate vehicles traveling toward the point of dispatch to reach the point of dispatch is less than a narrowing down time threshold,
    based upon the vehicle narrowing down condition being satisfied, stop the dispatch of at least one vehicle of the dispatched candidate vehicles traveling toward the point of dispatch.

2. The vehicle dispatch system according to claim 1, wherein the server is further configured to exclude at least one of the routes so as not to satisfy the duplication condition are present when the two dispatched candidate vehicles whose routes satisfy the duplication condition.

3. The vehicle dispatch system according to claim 1, wherein the server is further configured to cause any one of at least two or more of the dispatched candidate vehicles running toward the point of dispatch to indicate the pickup display with respect to the outside of the vehicle, and the remaining dispatched candidate vehicle does not indicate the pickup display.

4. The vehicle dispatch system according to claim 1, wherein the server is further configured to:
    cause a user terminal to display vehicle dispatch related information;
    cause the user terminal to display that any one of at least two or more of the vehicle dispatch candidate vehicles traveling toward the point of dispatch cannot be dispatched, and causes the user terminal to display that the remaining dispatched candidate vehicles can be dispatched.

5. The vehicle dispatch system according to claim 1, wherein the server is further configured to:
    calculate the number of remote assistance requests, which is the number of remote assistance requests that the dispatched candidate vehicle requests a remote operator for remote assistance, based on the route and a remote assistance request condition set in advance;
    wherein the dispatched candidate vehicles are remote assistance vehicles for performing autonomous driving by receiving remote assistance from the remote operator, and
    narrow down the dispatched candidate vehicles so that the total number of the remote assistance requests is equal to or less than a total request threshold.

6. The vehicle dispatch system according to claim 2, wherein the server is further configured to cause any one of at least two or more of the dispatched candidate vehicles running toward the point of dispatch to indicate the pickup display with respect to the outside of the vehicle, and the remaining dispatched candidate vehicle does not indicate the pickup display.

7. The vehicle dispatch system according to claim 2, wherein the server is further configured to:
    cause a user terminal to display vehicle dispatch related information;
    cause the user terminal to display that any one of at least two or more of the vehicle dispatch candidate vehicles traveling toward the point of dispatch cannot be dispatched, and causes the user terminal to display that the remaining dispatched candidate vehicles can be dispatched.

8. The vehicle dispatch system according to claim 2, wherein the server is further configured to:
    calculate the number of remote assistance requests, which is the number of remote assistance requests that the dispatched candidate vehicle requests a remote operator for remote assistance, based on the route and a remote assistance request condition set in advance;

wherein the dispatched candidate vehicles are remote assistance vehicles for performing autonomous driving by receiving remote assistance from the remote operator, and narrow down the dispatched candidate vehicles so that the total number of the remote assistance requests is equal to or less than a total request threshold.

9. The vehicle dispatch system according to claim 3, wherein the server is further configured to:

calculate the number of remote assistance requests, which is the number of remote assistance requests that the dispatched candidate vehicle requests a remote operator for remote assistance, based on the route and a remote assistance request condition set in advance;

wherein the dispatched candidate vehicles are remote assistance vehicles for performing autonomous driving by receiving remote assistance from the remote operator, and narrow down the dispatched candidate vehicles so that the total number of the remote assistance requests is equal to or less than a total request threshold.

10. The vehicle dispatch system according to claim 4, wherein the server is further configured to:

calculate the number of remote assistance requests, which is the number of remote assistance requests that the dispatched candidate vehicle requests a remote operator for remote assistance, based on the route and a remote assistance request condition set in advance;

wherein the dispatched candidate vehicles are remote assistance vehicles for performing autonomous driving by receiving remote assistance from the remote operator, and narrow down the dispatched candidate vehicles so that the total number of the remote assistance requests is equal to or less than a total request threshold.

11. A vehicle dispatch server for dispatching a plurality of autonomous driving vehicles to a predetermined point of dispatch, the vehicle dispatch server comprising:

a processor configured to:

select a plurality of dispatched candidate vehicles for the point of dispatch from the autonomous driving vehicles based on the point of dispatch and positions of the autonomous driving vehicles;

search routes to the point of dispatch for the dispatched candidate vehicles based on the point of dispatch, the positions of dispatched candidate vehicles and map information;

dispatch at least two or more of the dispatched candidate vehicles to the point of dispatch, when the dispatched candidate vehicles is are selected, after the dispatched candidate vehicles are dispatched so as to travel toward the point of dispatch, determine whether or not a preset vehicle narrowing down condition is satisfied based on a distance between the point of dispatch and the dispatched candidate vehicles traveling toward the point of dispatch or a required time of the dispatched candidate vehicles arrival to the point of dispatch, wherein the vehicle narrowing down condition is satisfied when the distance between any one of the dispatched candidate vehicles traveling toward the point of dispatch and the point of dispatch is less than a narrowing down distance threshold value, or when the time required for any one of the dispatched candidate vehicles traveling toward the point of dispatch to reach the point of dispatch is less than a narrowing down time threshold, based upon the vehicle narrowing down condition being satisfied, stop the dispatch of at least one vehicle of the dispatched candidate vehicles traveling toward the point of dispatch.

12. A vehicle dispatch method in a vehicle dispatch system for dispatching a plurality of autonomous driving vehicles to a predetermined point of dispatch, the method comprising:

selecting a plurality of dispatched candidate vehicles for the point of dispatch from the autonomous driving vehicles based on the point of dispatch and positions of the autonomous driving vehicles;

searching routes to the point of dispatch for the dispatched candidate vehicles based on the point of dispatch, the positions of dispatched candidate vehicles and map information;

dispatching at least two or more of the dispatched candidate vehicles to the point of dispatch, when the dispatched candidate vehicles are selected, after the dispatched candidate vehicles are dispatched so as to travel toward the point of dispatch, determining whether or not a preset vehicle narrowing down condition is satisfied based on a distance between the point of dispatch and the dispatched candidate vehicles traveling toward the point of dispatch or a required time of the dispatched candidate vehicles arrival to the point of dispatch, wherein the vehicle narrowing down condition is satisfied when the distance between any one of the dispatched candidate vehicles traveling toward the point of dispatch and the point of dispatch is less than a narrowing down distance threshold value, or when the time required for any one of the dispatched candidate vehicles traveling toward the point of dispatch to reach the point of dispatch is less than a narrowing down time threshold, based upon the vehicle narrowing down condition being satisfied, stopping the dispatch of at least one vehicle of the dispatched candidate vehicles traveling toward the point of dispatch.

13. The vehicle dispatch system according to claim 1, wherein the server is further configured to determine that the vehicle narrowing down condition is satisfied when a total length of the distance traveled relative to a total length of the routes of all the dispatched candidate vehicles traveling toward the point of dispatch reaches a certain ratio.

14. The vehicle dispatch system according to claim 1, wherein the server is further configured to determine that the vehicle narrowing down condition is satisfied when an elapsed time of all the dispatched candidate vehicles traveling toward the point of dispatch becomes a certain percentage of the total required time.

* * * * *